US011128764B2

(12) United States Patent
Kuwabara

(10) Patent No.: US 11,128,764 B2
(45) Date of Patent: Sep. 21, 2021

(54) IMAGING APPARATUS, CONTROL METHOD, AND NON-TRANSITORY COMPUTER READABLE MEDIUM

(71) Applicant: CANON KABUSHIKI KAISHA, Tokyo (JP)

(72) Inventor: Yasuhiro Kuwabara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 16/410,210

(22) Filed: May 13, 2019

(65) Prior Publication Data
US 2019/0356792 A1 Nov. 21, 2019

(30) Foreign Application Priority Data

May 17, 2018 (JP) .............................. JP2018-095205
Apr. 26, 2019 (JP) .............................. JP2019-086091

(51) Int. Cl.
H04N 1/00 (2006.01)
H04N 5/232 (2006.01)

(52) U.S. Cl.
CPC ..... H04N 1/00172 (2013.01); H04N 1/00129 (2013.01); H04N 5/23238 (2013.01); H04N 5/23245 (2013.01); H04N 5/232411 (2018.08)

(58) Field of Classification Search
None
See application file for complete search history.

(56) References Cited

U.S. PATENT DOCUMENTS 5,901,252 A * 5/1999 Kawakami ........... G06K 9/4619
345/648
6,195,789 B1 * 2/2001 Matsunaga ........... G06T 11/203
345/420

(Continued)

FOREIGN PATENT DOCUMENTS

CN 104104873 A 10/2014
CN 104350734 A 2/2015

(Continued)

OTHER PUBLICATIONS

Office Action issued in Chinese Appln. No. 201910409846.3 dated Nov. 27, 2020. English translation provided.

Primary Examiner — Jefferey F Harold
Assistant Examiner — Mustafizur Rahman
(74) Attorney, Agent, or Firm — Rossi, Kimms & McDowell LLP

(57) ABSTRACT

An imaging apparatus includes: a plurality of image processing units output images obtained by imaging an object respectively in different directions; a generating unit combines images output by the plurality of image processing units; a recording unit; acquiring unit acquires display range information; a control unit: controls the plurality of image processing units to drive in a first mode, in a case where the combined image is recorded in the recording medium; and controls (1) a first image processing unit which outputs an image corresponding to a displayed range in the combined image to drive in the first mode, and (2) a second image processing unit which outputs an image corresponding to a non-displayed range in the combined image to drive in a second mode, in a case where the combined image is not recorded in the recording medium.

7 Claims, 25 Drawing Sheets

(56) References Cited

U.S. PATENT DOCUMENTS

| | | | | |
|---|---|---|---|---|
| 8,265,374 | B2* | 9/2012 | Kondo | G06T 15/20 |
| | | | | 345/421 |
| 10,257,413 | B2* | 4/2019 | Ura | H04N 5/23219 |
| 2002/0024593 | A1* | 2/2002 | Bouguet | G01B 11/2504 |
| | | | | 348/46 |
| 2004/0095357 | A1* | 5/2004 | Oh | G06T 15/205 |
| | | | | 345/589 |
| 2004/0234155 | A1* | 11/2004 | Hoshuyama | G06T 5/007 |
| | | | | 382/254 |
| 2006/0244749 | A1* | 11/2006 | Kondo | G06T 15/20 |
| | | | | 345/427 |
| 2010/0020165 | A1* | 1/2010 | Crucs | A61B 6/145 |
| | | | | 348/77 |
| 2013/0265383 | A1* | 10/2013 | Yamashita | G06T 5/006 |
| | | | | 348/14.08 |
| 2014/0348231 | A1* | 11/2014 | Chaudhury | H04N 19/23 |
| | | | | 375/240.08 |
| 2018/0227457 | A1* | 8/2018 | Morita | H04N 5/77 |
| 2019/0007609 | A1* | 1/2019 | Isobe | H04N 5/23293 |
| 2019/0028643 | A1* | 1/2019 | Oryoji | G03B 37/04 |
| 2019/0098211 | A1* | 3/2019 | Ohmura | H04N 7/142 |
| 2019/0174060 | A1* | 6/2019 | Oba | B60R 1/00 |
| 2019/0179140 | A1* | 6/2019 | Oba | H04N 5/2254 |
| 2019/0306421 | A1* | 10/2019 | Takeda | H04W 4/029 |
| 2019/0342501 | A1* | 11/2019 | Yun | G06T 7/20 |

FOREIGN PATENT DOCUMENTS

| | | |
|---|---|---|
| CN | 107454309 A | 12/2017 |
| JP | 2010232908 A | 10/2010 |
| JP | 2017139812 A | 8/2017 |

* cited by examiner

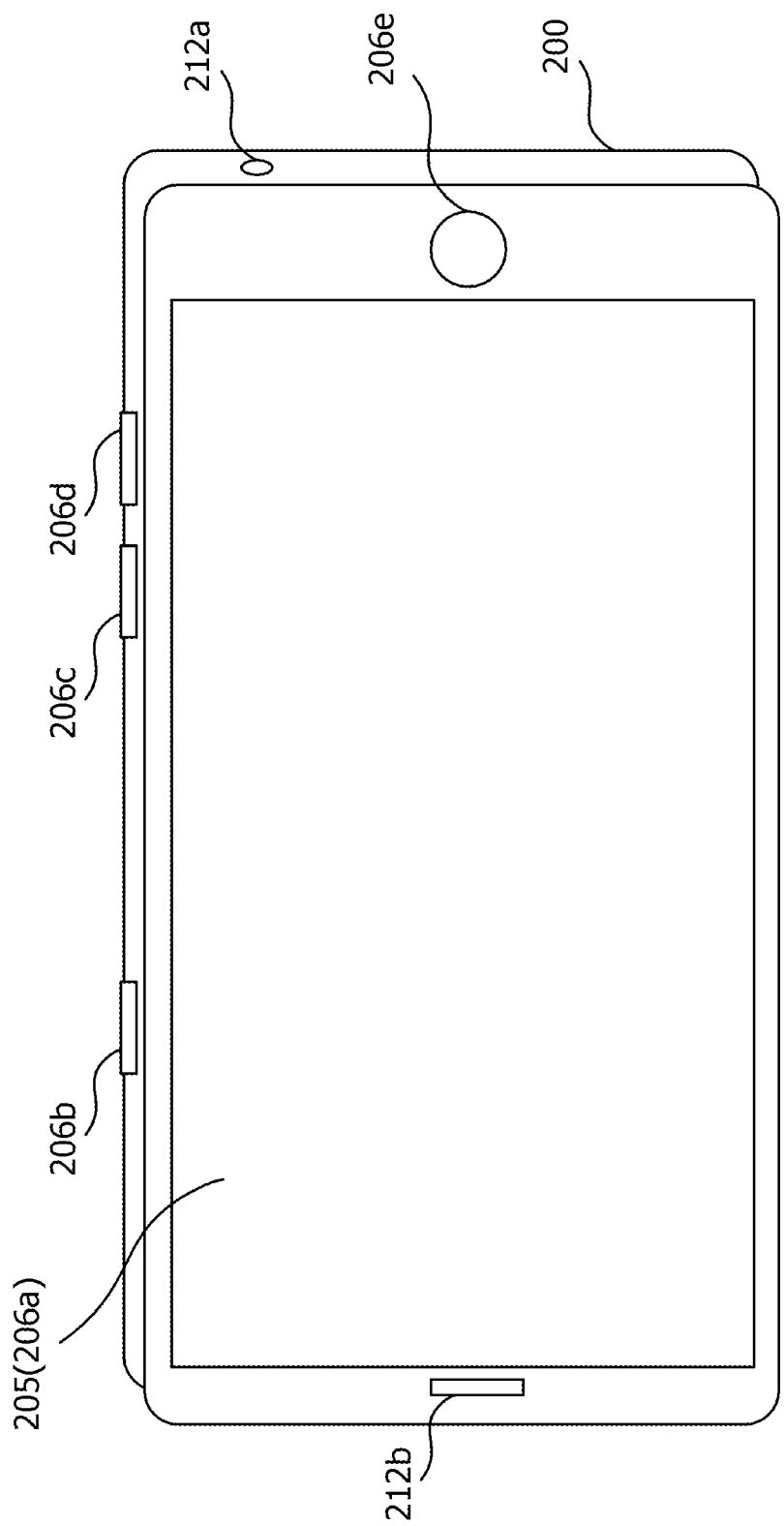

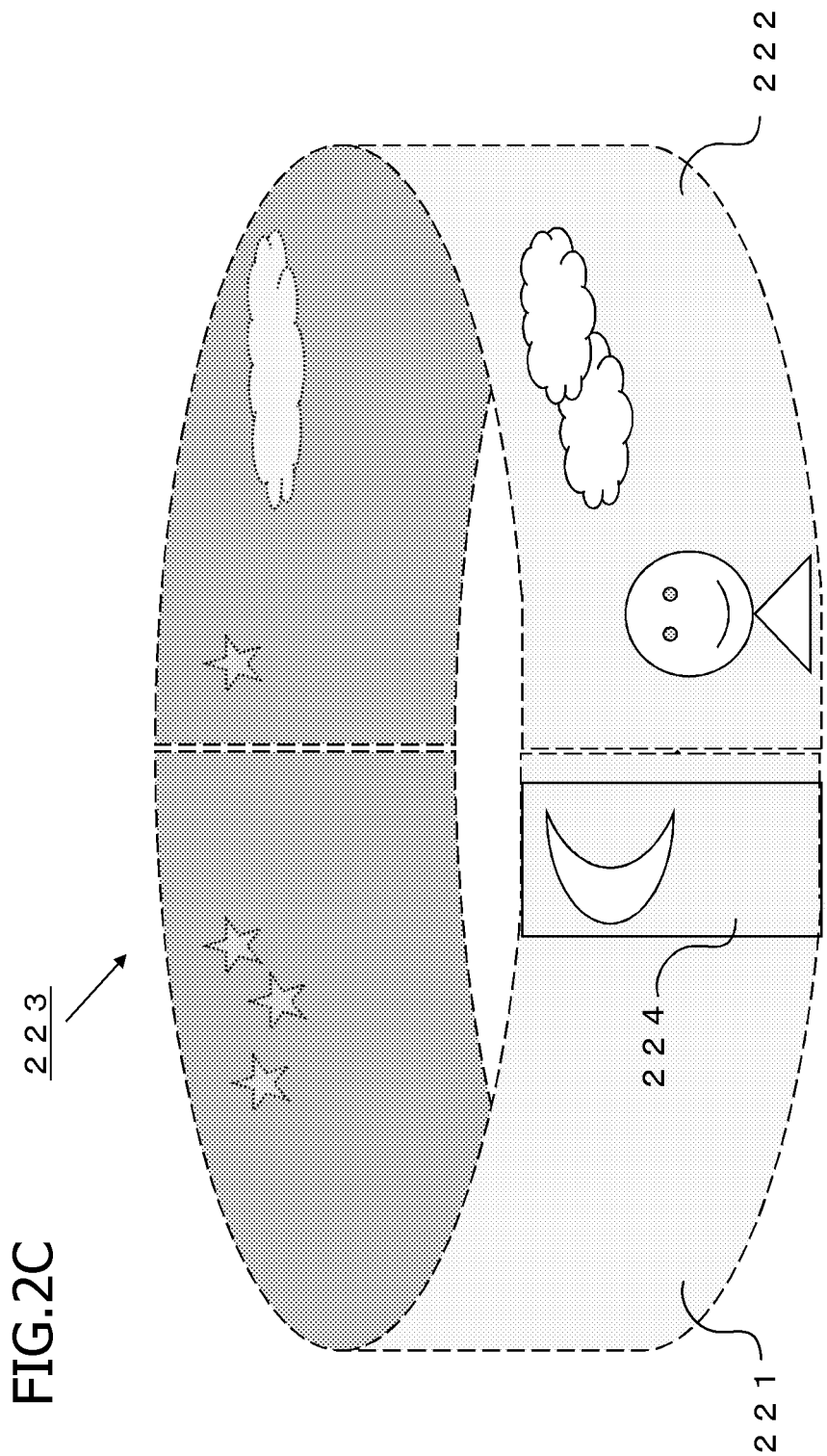

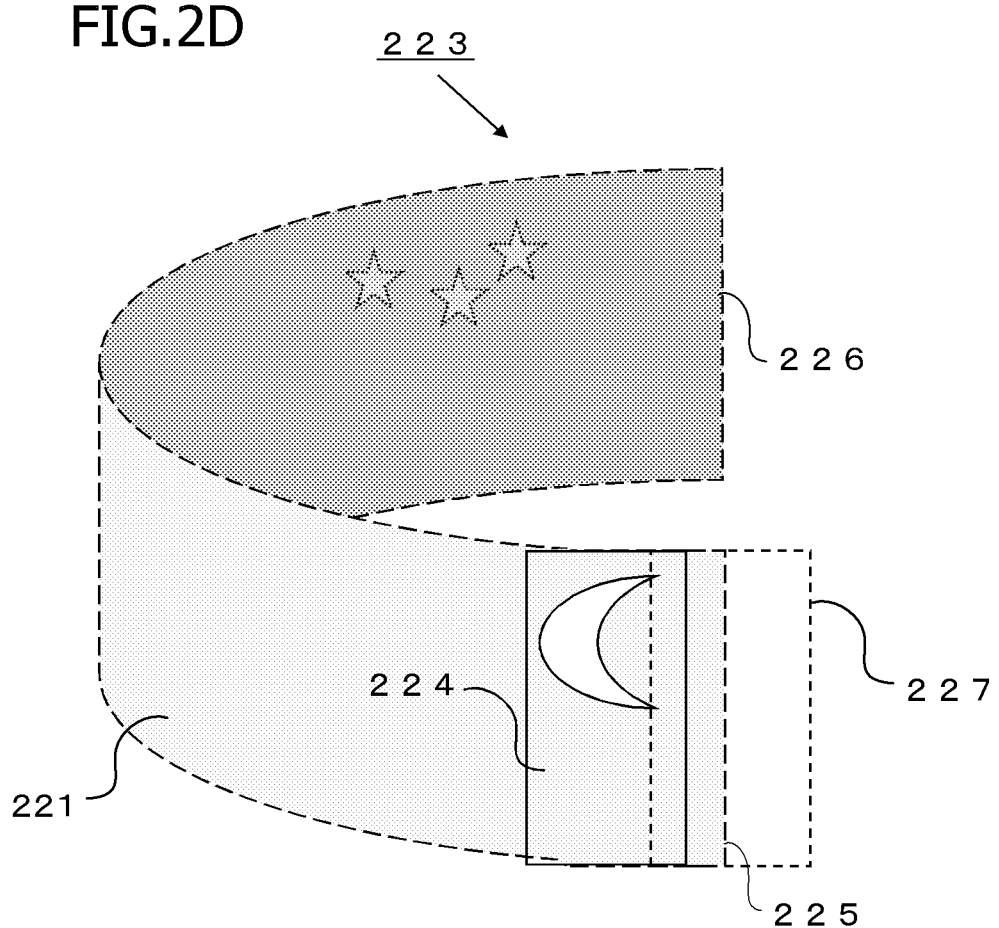

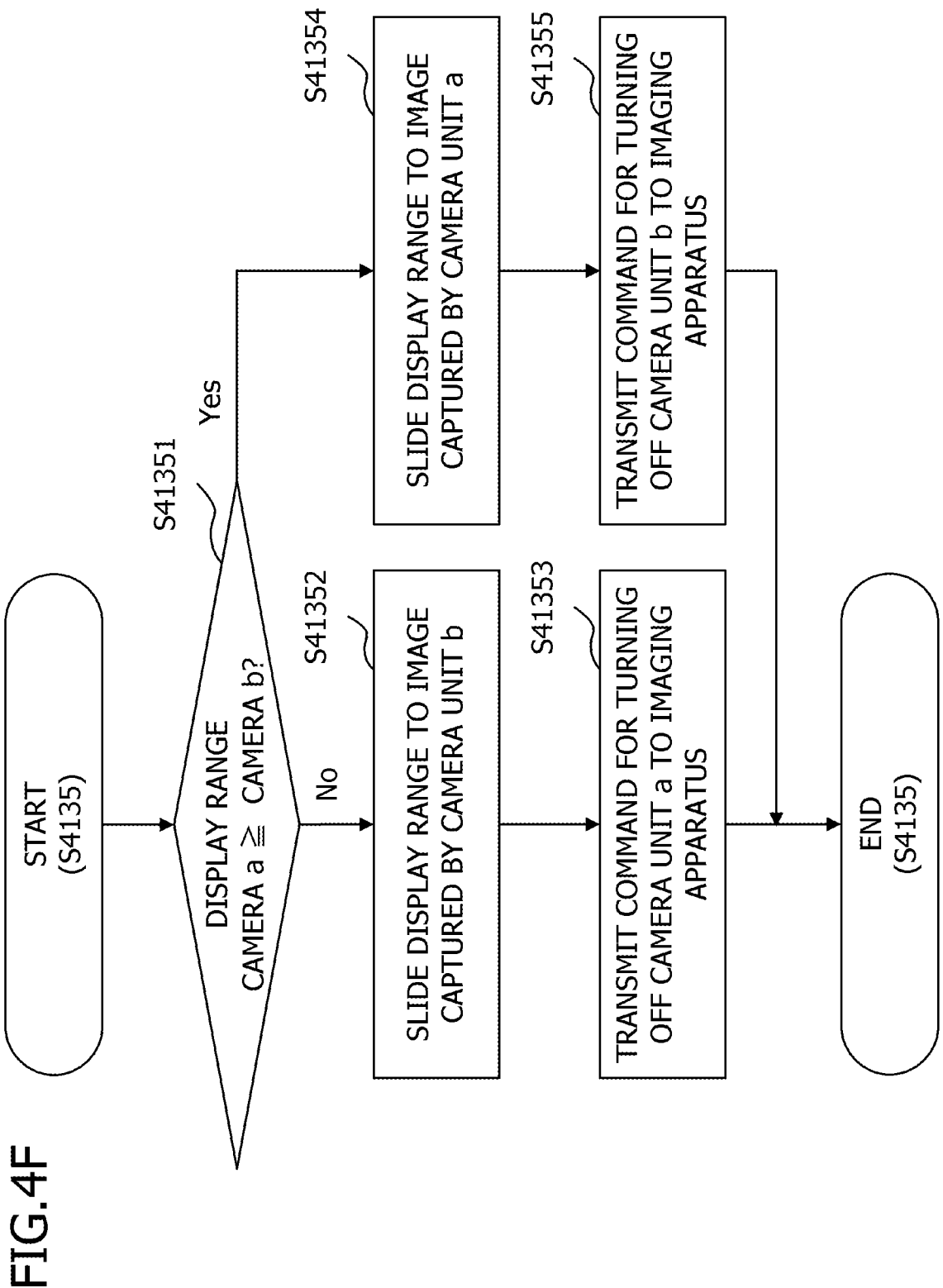

IMAGING APPARATUS, CONTROL METHOD, AND NON-TRANSITORY COMPUTER READABLE MEDIUM

BACKGROUND OF THE INVENTION

Field of the Invention

The present invention relates to a display control apparatus, an imaging apparatus, a control system, a control method, and a program.

Description of the Related Art

In recent years, an imaging apparatus capable of photographing an image in a wider range than a human view angle such as a celestial sphere image (an omnidirectional image) has been spread. Such an imaging apparatus simultaneously drives a plurality of camera units to capture an object image.

In Japanese Patent Application Laid-Open No. 2010-232908, by reducing a frequency of a driving pulse in a part of a plurality of camera units according to presence or absence of an operation instruction, power saving is achieved without spoiling a function of simultaneously photographing images in omnidirectional 360 degrees.

In Japanese Patent Application Laid-Open No. 2017-139812, power saving is achieved by turning off a power supply of an imaging apparatus when there is no change of a predetermined time in a state (an operation state or a stationary state acquired by an acceleration sensor) of the imaging apparatus and a remote controller for performing operation of the imaging apparatus

SUMMARY OF THE INVENTION

However, in Japanese Patent Application Laid-Open No. 2010-232908, when a part of a celestial sphere image of a live view image (an image acquired from a camera substantially on a real-time basis) is displayed, outputs of camera units other than a camera unit that photographs an image displayed on a display device (hereinafter referred to as effective camera unit) are wasted. In Japanese Patent Application Laid-Open No. 2017-139812, outputs of camera units are maintained while the imaging apparatus or a display device is moved. Therefore, outputs of camera units other than an effective camera unit are wasted as in Japanese Patent Application Laid-Open No. 2010-232908.

Therefore, an object of the present invention is to provide a technique for, when images output from a plurality of imaging apparatuses are combined and displayed on a display device, appropriately reducing power consumption of the imaging apparatuses.

The present invention in its first aspect provides an imaging apparatus comprising:
a plurality of image processing units configured to output images obtained by imaging an object respectively in different directions;
a generating unit configured to combine images output by the plurality of image processing units to thereby generate a combined image;
a recording unit configured to record the combined image in a recording medium;
acquiring unit configured to acquire display range information indicating a display range displayed on a screen in the combined image; and
a control unit is configured:
to control the plurality of image processing units to drive in a first mode regardless of the display range information, in a case where the combined image is recorded in the recording medium; and
to control (1) a first image processing unit to drive in the first mode wherein the first image processing unit outputs an image corresponding to a displayed range in the combined image, and (2) a second image processing unit to drive in a second mode which power is saved compared with the first mode wherein the second image processing unit outputs an image corresponding to a non-displayed range in the combined image on the basis of the display range information, in a case where the combined image is not recorded in the recording medium.

The present invention in its second aspect provides a control method of an imaging apparatus including a plurality of image processing units configured to output images obtained by imaging an object respectively in different directions, the control method comprising:
combining the images output by the plurality of image processing units to thereby generate a combined image;
recording the combined image in a recording medium;
acquiring display range information indicating a display range displayed on a screen in the combined image;
controlling the plurality of image processing units to drive in a first mode regardless of the display range information, in a case where the combined image is recorded in the recording medium; and
controlling (1) a first image processing unit to drive in the first mode wherein the first image processing unit outputs an image corresponding to a displayed range in the combined image, and (2) a second image processing unit to drive in a second mode which power is saved compared with the first mode wherein the second image processing unit outputs an image corresponding to a non-displayed range in the combined image on the basis of the display range information, in a case where the combined image is not recorded in the recording medium.

The present invention in its third aspect provides a non-transitory computer readable medium that stores a program, wherein the program causes a computer to execute: a control method of an imaging apparatus including a plurality of image processing units configured to output images obtained by imaging an object respectively in different directions, the control method comprising:
combining the images output by the plurality of image processing units to thereby generate a combined image;
recording the combined image in a recording medium;
acquiring display range information indicating a display range displayed on a screen in the combined image;
controlling the plurality of image processing units to drive in a first mode regardless of the display range information, in a case where the combined image is recorded in the recording medium; and
controlling (1) a first image processing unit to drive in the first mode wherein the first image processing unit outputs an image corresponding to a displayed range in the combined image, and (2) a second image processing unit to drive in a second mode which power is saved compared with the first mode wherein the second image processing unit outputs an image corresponding to a non-displayed range in the combined image on the basis of the display range information, in a case where the combined image is not recorded in the recording medium.

According to the present invention, it is possible to provide the technique for, when images output from a plurality of imaging apparatuses are combined and displayed on a display device, appropriately reducing power consumption of the imaging apparatuses.

Further features of the present invention will become apparent from the following description of exemplary embodiments with reference to the attached drawings.

BRIEF DESCRIPTION OF THE DRAWINGS

FIG. 2A is an exterior view showing an example of a display control apparatus according to the embodiment;

FIG. 2C is a diagram showing an example of a combined image according to the embodiment;

FIG. 2D is a diagram showing an example of a part of the combined image according to the embodiment;

FIG. 4F is a flowchart showing an example of boundary processing of the display control apparatus according to the embodiment;

DESCRIPTION OF THE EMBODIMENTS

First Embodiment

An embodiment of the present invention is explained below.

<Overview>

In this embodiment, an example is explained in which a celestial sphere image is captured using an imaging apparatus including a plurality of camera units and a part of the celestial sphere image is displayed using a display control apparatus. The celestial sphere image in this embodiment is an image having a field of view of 360 degrees obtained by joining image data (imaging data) captured by the plurality of camera units of the imaging apparatus. The configurations and processing contents of an imaging apparatus 100 and a display control apparatus 200 according to this embodiment are explained below in order.

<Configuration of Imaging Apparatus 100>

Figure 1A:
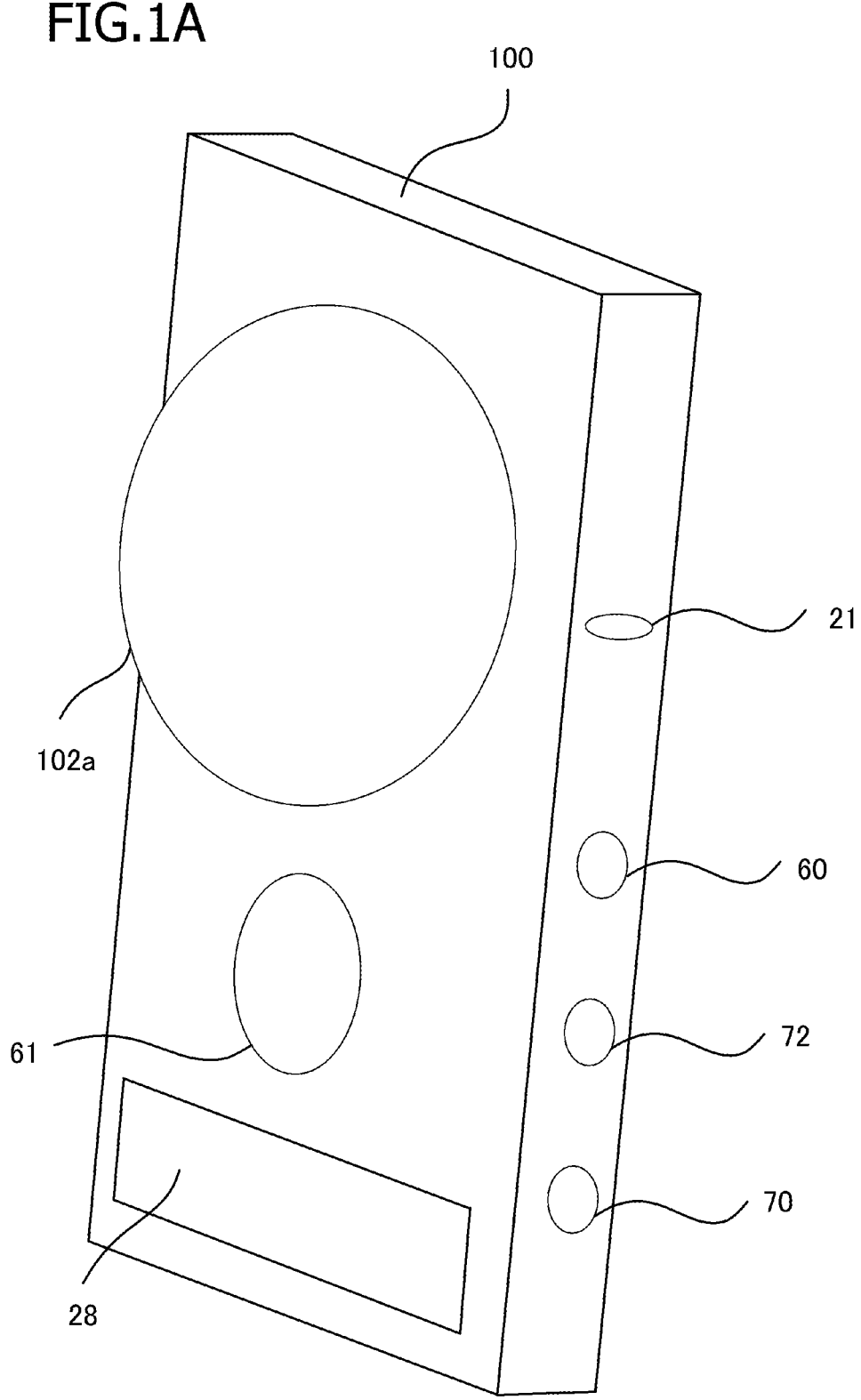
FIG. 1A is a front exterior view showing an example of an imaging apparatus according to an embodiment.
Figure 1B:
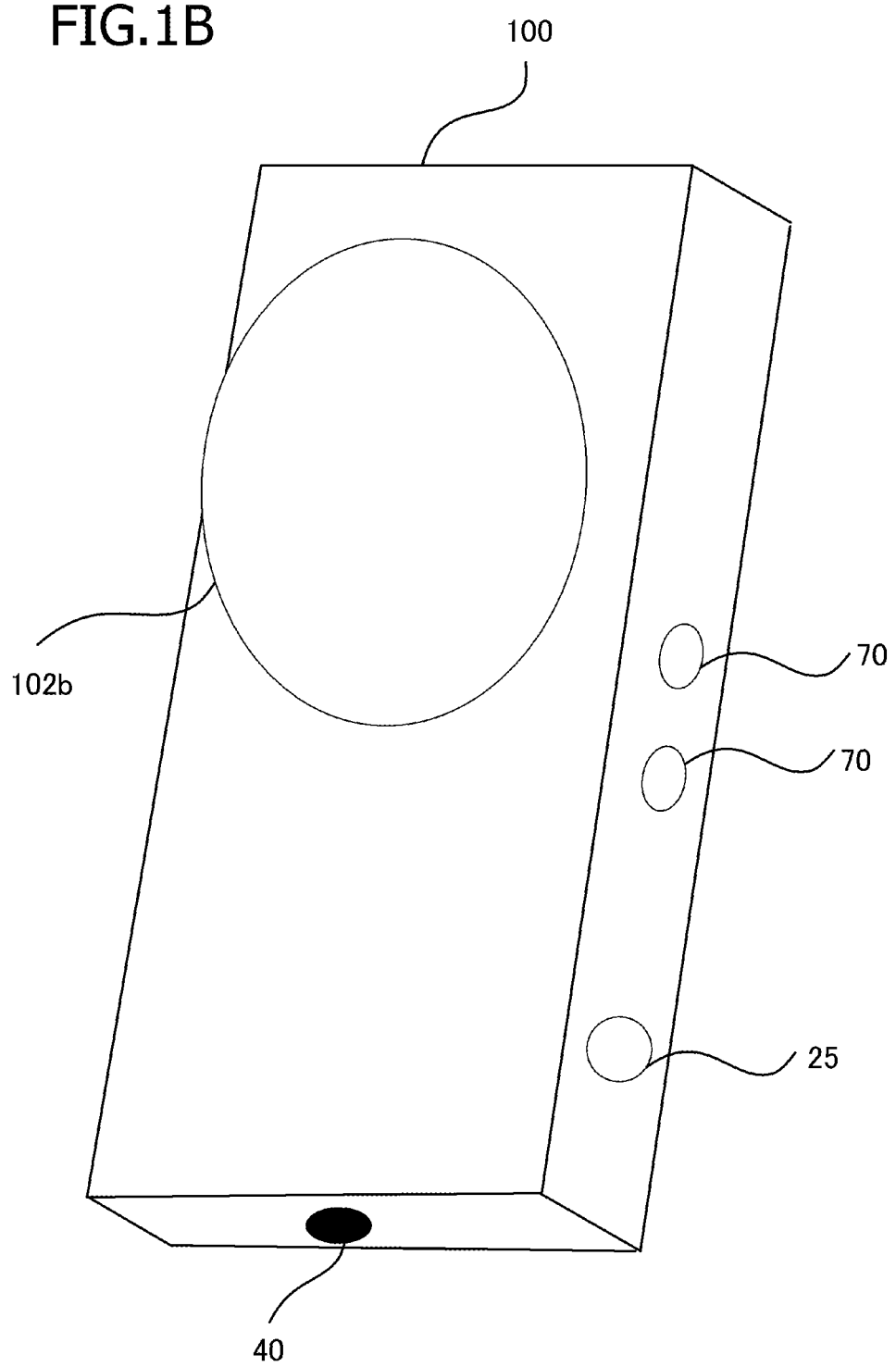
FIG. 1B is a rear exterior view showing an example of the imaging apparatus according to the embodiment.

FIG. 1A is a front exterior view (a perspective view) showing an example of the imaging apparatus 100 according to this embodiment. FIG. 1B is a rear exterior view (a perspective view) of the imaging apparatus 100. The imaging apparatus 100 is an information processing device (a computer) including an arithmetic device (a processor), a memory, a storage device, and an input and output device. The imaging apparatus 100 executes a program stored in the storage device, whereby functions explained below of the imaging apparatus 100 are provided. A part or all of the functions may be implemented by a dedicated logic circuit such as an ASIC or an FPGA. In this embodiment, an imaging apparatus including two camera units is explained as an example. However, the number of camera units may be three or more.

The imaging apparatus 100 according to this embodiment is also grasped as a celestial sphere camera (an omnidirectional camera) including two camera units "a" and "b". The camera unit "a" is a wide angle camera having a photographing range in a wide range of 180 degrees or more in upward, downward, left, and right directions on the front side of the imaging apparatus 100. The camera unit "b" is a wide angle camera having a photographing range in a wide range of 180 degrees or more in upward, downward, left, and right directions on the rear side of the imaging apparatus 100. Barriers 102a and 102b are protection windows for photographing lenses 103a and 103b for the camera units "a" and "b". The barriers 102a and 102b may be surfaces on outer sides of the photographing lenses 103a and 103b themselves.

A display unit 28 is a display unit that displays various kinds of information. A shutter button 61 is an operation unit for giving a photographing instruction. A mode changeover switch 60 is an operation unit for switching various modes. A connection I/F 25 is a connector for a connection cable for connection to external devices such as a smartphone, a personal computer, and a television and the imaging apparatus 100. An operation unit 70 is an operation unit including operation members such as various switches, buttons, dials, or touch sensors for receiving various kinds of operation from a user. A power switch 72 is a push button for switching ON/OFF of a power supply.

A light-emitting unit 21 is a light-emitting member such as a light emitting diode (LED). The light-emitting unit 21 notifies various states of the imaging apparatus 100 to the user with light emission patterns or light emission colors. A fixing unit 40 is, for example, a tripod screw hole and is a member for fixing the imaging apparatus 100 to a fixing instrument such as a tripod and setting the imaging apparatus 100.

Figure 1C:
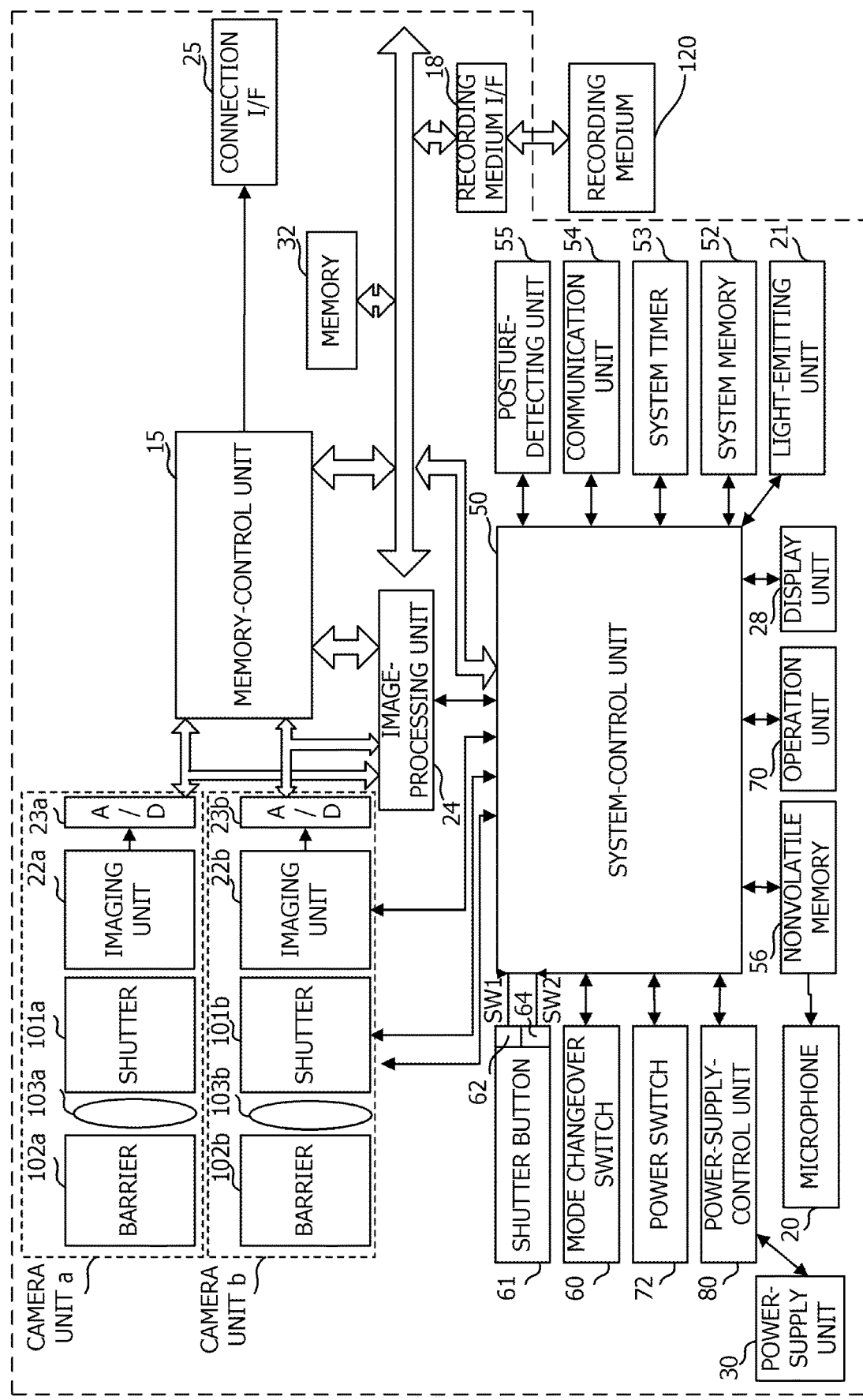
FIG. 1C is a functional block diagram showing an example of the imaging apparatus according to the embodiment.

FIG. 1C is a functional block diagram showing an example of the imaging apparatus 100.

The barriers 102a and 102b cover imaging systems of the camera units "a" and "b" including the photographing lenses 103a and 103b of the imaging apparatus 100 to thereby prevent stains and breakages of the imaging systems including the photographing lenses 103a and 103b, shutters 101a and 101b, and imaging units 22a and 22b. The photographing lenses 103a and 103b are lens groups including zoom lenses and focus lenses and are, for example, wide angle lenses. The shutters 101a and 101b are shutters including an aperture function for adjusting an incident amount of object light on the imaging units 22a and 22b. The imaging units 22a and 22b are imaging elements configured by CCD or CMOS elements or the like that convert an optical image into an electric signal. A/D converters 23a and 23b are functional units that convert analog signals output from the imaging units 22a and 22b into digital signals.

In this embodiment, a VR (Virtual Reality) image is captured by the imaging units 22a and 22b. The VR image includes a celestial sphere image (an omnidirectional image) captured by a celestial sphere camera (an omnidirectional camera) and a panoramic image (panoramic image data) having a video range (an effective video range) wider than a display range that can be displayed on a display device at a time. The VR image includes not only a still image but also a moving image and a live view (LV) image (an image acquired from a camera substantially on a real-time basis).

The VR image has a video range (an effective video range) of a field of view of maximum 360 degrees in the up-down direction (a vertical angle, an angle from the zenith, an elevation angle, a depression angle, and an altitude angle) and maximum 360 degrees in the left-right direction (a horizontal angle and an azimuth angle). The VR image includes an image having an angle of view (a visual field range) wider than an angle of view photographable by a normal camera or a video range (an effective video range) wider than a display range that can be displayed on the display device at a time even if the angle of view or the video range is smaller than 360 degrees in the up-down direction and smaller than 360 degrees in the left-right direction. For example, an image photographed by a celestial sphere camera capable of photographing an object in a field of view (an angle of view) at 360 degrees in the left-right direction (the horizontal angle and the azimuth angle) and 210 degrees of a vertical angle centering on the zenith is a type of the VR image.

For example, an image photographed by a camera capable of photographing an object in a field of view (an angle of view) of 180 degrees in the left-right direction (the horizontal angle and the azimuth angle) 180 degrees and 180 degrees of a vertical angle centering on the horizontal direction is a type of the VR image. That is, an image having a video range of a field of view of 160 degrees (±80 degrees) respectively in the up-down direction and the left-right direction and having a video range wider than a range visually recognizable by a human at a time is a type of the VR image. When the VR image is VR-displayed as explained below, it is possible to view an omnidirectional video seamless in the left-right direction (a horizontal rotation direction) by changing a posture of the display device in a left-right rotation direction. It is possible to view an omnidirectional view seamless in a range of ±105 degrees viewed from right above (the zenith) in the up-down direction (a vertical rotation direction). However, a range exceeding 105 degrees viewed from right above is a blank where a video is absent. The VR image can also be considered "an image having a video range in at least a part of a virtual space (a VR space)".

The VR display is a display method capable of changing a display range in which, in a VR image, a video in a visual field range corresponding to a posture of the display device is displayed. When the user wears, for example, a head mounted display (HMD) as the display device and views the VR image, a video in a visual field range corresponding to a direction of the face of the user is displayed. For example, it is possible to display, in the VR image, a video at a view angle (an angle of view) centering on 0 degree (a specific direction; e.g., the north) in the left-right direction and 90 degrees (90 degrees from the azimuth, that is, the level) in the up-down direction at a certain point in time. When the posture of the display device is reversed (e.g., a display surface is changed from southward to northward) from this state, the display range is changed to, in the same VR image, a video at a view angle centering on 180 degree (the opposite direction, e.g., the south) in the left-right direction and 90 degrees (the level) in the up-down direction.

When the user is viewing the HMD, if the user turns the face from the north to the south (that is, turns back), a video displayed on the HMD changes from a video in the north to a video in the south. With such VR display, it is possible to cause the user to visually feel as if the user is present on the spot in the VR image (a VR space). The VR display may be performed by attaching a display device such as a smartphone to a VR goggle (a head mount adapter). The attached smartphone is considered a type of the HMD. A display method for the VR image is not limited to the above. For example, the display range may be moved (scrolled) according to user operation on a touch panel, a direction button, or the like rather than a change in the posture.

An image-processing unit 24 is a functional unit that performs predetermined pixel interpolation, resize processing such as reduction, and color conversion processing on data received from the A/D converters 23a and 23b or data received from a memory-control unit 15. The image-processing unit 24 performs predetermined arithmetic processing using captured image data. A system-control unit 50 performs exposure control and range finding control on the basis of an arithmetic operation result obtained by the image-processing unit 24. Consequently, AF (Auto Focus) processing, AE (Auto Exposure) processing, and EF (Electronic Flash, flash pre-light emission) of a TTL (Through The Lens) scheme are performed. Further, the image-processing unit 24 performs predetermined arithmetic processing using captured image data and performs AWB (Auto White Balance) processing of the TTL scheme based on an obtained arithmetic operation result.

The image-processing unit 24 applies basic image processing to two images (fisheye images) obtained from the A/D converters 23a and 23b and thereafter combines (performs image connecting processing of) the two images to generate a single VR image (a combined image). FIG. 2C shows a conceptual diagram for combining image processing results of an image 221 (a broken line rectangle) obtained from the A/D converter 23a of the camera unit "a" and an image 222 (a broken line rectangle) obtained from the A/D converter 23b of the camera unit "b" to generate a VR image 223. In the image connecting processing of the two images, the image-processing unit 24 calculates, in the respective two images, shift amounts between reference images and comparative images for each area according to pattern matching processing and detects a connecting position. The image-processing unit 24 performs distortion correction processing of the two images according to geometric transformation considering the detected connecting position and optical system lens characteristics and converts the two images into a celestial sphere image format. The image-processing unit 24 blends the two images of the celestial sphere image format to finally generate one celestial sphere image data (VR image). The generated celestial image data is an image obtained by using equirectangular projection. Positions of pixels can be associated with coordinates on the surface of a sphere.

Output data from the A/D converters 23a and 23b are written in a memory 32 via the image-processing unit 24 and the memory-control unit 15 or via the memory-control unit 15. The memory 32 stores image data obtained by the imaging unit 22 and converted into digital data by the A/D converter 23 and an image to be output from the connection I/F 25 to an external display. The memory 32 has a storage capacity sufficient for storing a predetermined number of still images and a moving image and sound in a predetermined time.

The memory 32 also functions as a memory for image display (a video memory). Data for image display stored in the memory 32 can be output from the connection I/F 25 to the external display. VR images generated by the image-processing unit 24, using images captured by at least one of the imaging units 22a and 22b, and accumulated in the memory 32 are sequentially transferred to and displayed on the external display. Consequently, the external display can function as an electronic viewfinder and perform live view display (LV display). In the following explanation, a live view-displayed image is referred to as LV image. The VR images accumulated in the memory 32 may be transferred to an external device (a smartphone, etc.) wirelessly connected via a communication unit 54 and may be displayed on the external device side to thereby be live view-displayed (remove LV-displayed).

A nonvolatile memory 56 is a memory functioning as an electrically erasable recordable recording medium. For example, an EEPROM (Electrically Erasable Programmable Read-Only Memory) is used. Constants, programs, and the like for the operation of the system-control unit 50 are stored in the nonvolatile memory 56. The programs refer to computer programs for executing various flowcharts explained below in this embodiment.

The system-control unit 50 is a control unit including at least one processor or circuit and is a functional unit that controls the entire imaging apparatus 100. The system-control unit 50 executes the programs recorded in the nonvolatile memory 56 explained above to realize respective kinds of processing in this embodiment explained below. For example, a RAM is used as a system memory 52. The constants and variables for the operation of the system-control unit 50, the programs read out from the nonvolatile memory 56, and the like are developed in the system memory 52. The system-control unit 50 controls the memory 32, the image-processing unit 24, and the memory-control unit 15 to thereby perform display control as well. A system timer 53 is a clocking unit that measures times used for various kinds of control and measures a time of an incorporated clock.

The mode changeover switch 60, the shutter button 61, and the operation unit 70 are operation units for inputting various operation instructions to the system-control unit 50. The mode changeover switch 60 switches an operation mode of the system-control unit 50 to any one of a still image recording mode, a moving image photographing mode, a reproduction mode, a communication connection mode, and the like. As modes included in the still image recording mode, there are an auto photographing mode, an auto scene discrimination mode, a manual mode, an aperture preferential mode (an Av mode), a shutter speed preferential mode (a Tv mode), and a program AE mode. There are various scene modes, which are photographing settings for each of photographing scenes, a custom mode, and the like. The user directly switches the operation mode to any one of the modes described above using the mode changeover switch 60. Alternatively, the user may once switch the display unit 28 to a list screen of photographing modes with the mode changeover switch 60 and thereafter select any one of a plurality of modes displayed on the display unit 28 and switch the operation mode using another operation member. Similarly, a plurality of modes may be included in the moving image photographing mode.

The power switch 72 is a push button for switching ON/OFF of the power supply. The light-emitting unit 21 is a light-emitting member such as a light emitting diode (LED) and is a functional unit that notifies various states of the imaging apparatus 100 to the user with light emission patterns or light emission colors. A recording medium 150 is a recording medium such as a memory card or a hard disk.

A first shutter switch 62 is turned on halfway in operation, that is, by so-called half press (a photographing preparation instruction) of the shutter button 61 provided in the imaging apparatus 100 and generates a first shutter switch signal SW1. The system-control unit 50 starts a photographing preparation operation such as the AF processing, the AE processing, the AWB processing, or the EF processing explained above according to the first shutter switch signal SW1.

A second shutter switch 64 is turned on at completion of operation, that is, by so-called full press (a photographing instruction) of the shutter button 61 and generates a second shutter switch signal SW2. The system-control unit 50 starts a series of photographing processing operation from a signal readout from the imaging unit 22 and writing of image data in the recording medium 150.

The shutter button 61 is not limited to an operation member with which operation in two stages of the full press and the half press is possible and may be an operation member with which only pressing in one stage is possible. In that case, the photographing preparation operation and the photographing processing are continuously performed according to the pressing in one stage. This is the same operation as operation performed when a shutter button that can be half-pressed and full-pressed is full-pressed (operation performed when SW1 and SW2 are substantially simultaneously generated).

Functions are allocated to the operation members of the operation unit 70 for each of scenes by selecting and operating various function icons and choices displayed on the display unit 28. The operation members act as various function buttons. As the function buttons, there are, for example, an end button, a return button, an image feed button, a jump button, a narrow-down button, and an attribute change button. For example, when a menu button is pressed, various settable menu screens are displayed on the display unit 28. The user can intuitively perform various settings by operating the operation unit 70 while viewing a menu screen displayed on the display unit 28.

A power-supply-control unit 80 is configured by a battery detection circuit, a DC-DC converter, a switch circuit that switches a block to be energized, and the like. The power-supply-control unit 80 performs detection of presence or absence of mounting of a battery, a type of the battery, and battery residual power. The power-supply-control unit 80 controls the DC-DC converter on the basis of a result of the detection and an instruction of the system-control unit 50 and supplies a necessary voltage to units including the recording medium 150 for a necessary period. A power-supply unit 30 is a power supply configured from a primary battery such as an alkali battery or a lithium battery, a secondary battery such as a NiCd battery, a NiMH battery, or a Li battery, an AC adapter, and the like.

A recording medium I/F 18 is an interface with the recording medium 150 such as a memory card or a hard disk. The recording medium 150 is a recording medium such as a memory card for recording a photographed image. The recording medium 150 is configured from a semiconductor memory, an optical disk, a magnetic disk, or the like. The recording medium 150 may be a replaceable recording medium detachably attachable to the imaging apparatus 100 or may be an incorporated recording medium.

The communication unit 54 is connected by radio or a wired cable and performs transmission and reception of a video signal, a sound signal, and the like. The communication unit 54 is connectable to a wireless LAN (Local Area Network) and the Internet as well. The communication unit 54 is capable of communicating with an external device through Bluetooth (registered trademark) and Bluetooth Low Energy (registered trademark) as well. The communication unit 54 is capable of transmitting images (including LV images) captured by the imaging units 22a and 22b and images recorded in the recording medium 150. The communication unit 54 may receive images and other various kinds of information from the external device.

A posture-detecting unit 55 detects a posture of the imaging apparatus 100 with respect to the gravity direction. The system-control unit 50 is capable of discriminating, on the basis of the posture detected by the posture-detecting unit 55, whether an image photographed by the imaging unit 22 is an image photographed by horizontally holding the imaging apparatus 100 or an image photographed by vertically holding the imaging apparatus 100. The system-control unit 50 is capable of discriminating to which degrees the imaging apparatus 100 is tilted in three-axis directions of yaw, pitch, and roll to photograph an image. The system-control unit 50 is capable of adding direction information corresponding to a posture detected by the posture-detecting unit 55 to an image file of VR images captured by the imaging units 22a and 22b and rotating an image (adjusting a direction of the image to correct a tilt) and recording the image. As the posture-detecting unit 55, an acceleration sensor, a gyro sensor, a terrestrial magnetism sensor, an azimuth (angle) sensor, an altitude sensor, and the like may be used solely, or in combination of two or more. The posture-detecting unit 55 is also capable of detecting a motion (pan, tilt, lift, standstill or not, and the like) of the imaging apparatus 100 using the sensors described above.

A microphone 20 is a microphone that collects sound around the imaging apparatus 100 recorded as sound of a moving image of a VR image. The connection I/F 25 is a connection plug to an HDMI (registered trademark) cable, a USB cable, or the like for connecting the imaging apparatus 100 to the external device and performing transmission and reception of a video.

<Configuration of Display Control Apparatus 200>

FIG. 2A is an exterior view showing an example of the display control apparatus 200, which is a type of an electronic device. The display control apparatus 200 is an information processing device (a computer) including an arithmetic device (a processor), a memory, a storage device, and an input and output device. The display control apparatus 200 executes programs stored in the storage device, whereby functions explained below of the display control apparatus 200 are provided. A part or all of the functions may be implemented by a dedicated logic circuit such as an ASIC or an FPGA.

A display unit 205 is a display unit that displays an image and various kinds of information. In this embodiment, the display unit 205 is configured integrally with a touch panel 206a as explained below. The display unit 205 detects touch operation on a display surface of the display unit 205. The display control apparatus 200 is capable of VR-displaying a VR image (VR content) on the display unit 205. An operation unit 206 (an operation receiving unit) includes the touch panel 206a and operation units 206b, 206c, 206d, and 206e. The operation unit 206b is a power button that receives operation for switching ON/OFF of a power supply of the display control apparatus 200. The operation units 206c and 206d are buttons for increasing and reducing volume of sound output from a sound-output unit (e.g., a speaker 212b explained below). The operation unit 206e is a button for causing the display unit 205 to display a home screen. A sound output terminal 212a is an earphone jack. The sound output terminal 212a outputs sound to an earphone, an external speaker, and the like. The speaker 212b is a main body-incorporated speaker that emits sound.

Figure 2B:
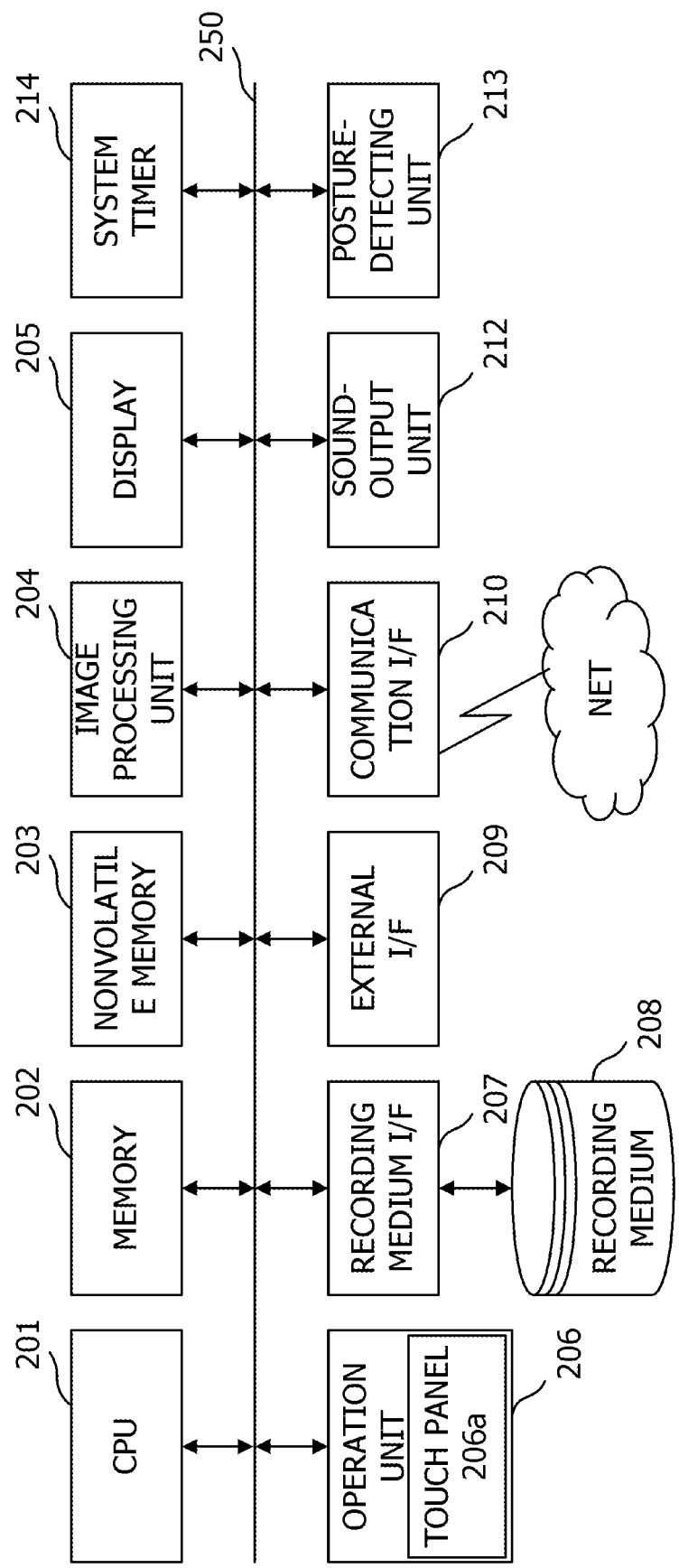
FIG. 2B is a functional block diagram showing an example of the display control apparatus according to the embodiment.

FIG. 2B is a functional block diagram showing an example of the display control apparatus 200. The display control apparatus 200 can be configured using a display device such as a smartphone.

In FIG. 2B, a CPU 201, a memory 202, a nonvolatile memory 203, an image-processing unit 204, a display unit 205, an operation unit 206, a storage medium I/F 207, an external I/F 209, and a communication I/F 210 are connected to an internal bus 250. A sound-output unit 212, a posture-detecting unit 213, and a system timer 214 are also connected to the internal bus 250. The units connected to the internal bus 250 exchange data with one another via the internal bus 250.

The CPU 201 is a control unit that controls the entire display control apparatus 200. The CPU 201 is configured using at least one processor or circuit. The memory 202 is, for example, a RAM (a volatile memory or the like in which a semiconductor element is used). The CPU 201 controls, according to, for example, programs stored in the nonvolatile memory 203, the units of the display control apparatus 200 using the memory 202 as a work memory. Image data and sound data, other data, various programs for the CPU 201 to operate, and the like are stored in the nonvolatile memory 203. The nonvolatile memory 203 is, for example, a flash memory or a ROM.

The image-processing unit 204 is a functional unit that applies various kinds of image processing to images stored in the nonvolatile memory 203 and a recording medium 208, a video signal acquired via the external I/F 209, an image acquired via the communication I/F 210, and the like. The images may be still images or may be moving images. The image processing performed by the image-processing unit 204 includes A/D conversion processing, D/A conversion processing, and encoding processing, compression processing, decode processing, enlargement processing/reduction processing (resize), noise reduction processing, and color conversion processing for image data. The image-processing unit 204 also performs various kinds of image processing such as panoramic development of a VR image, which is a wide range image having data in a wide range, mapping processing, and conversion on an omnidirectional image or a non-omnidirectional image. The image-processing unit 204 may be configured by a dedicated circuit block for applying specific image processing. Depending on a type of image processing, the CPU 201 is capable of applying the image processing according to a program without using the image-processing unit 204.

In the above explanation, the image-processing unit 24 of the imaging apparatus 100 combines (performs the image connecting processing of) two images (fisheye images) to generate a single VR image (a combined image). However, the display control apparatus 200 may generate a single VR image (a combined image). In this case, the two images (fisheye images) are transmitted from the imaging apparatus 100 to the display control apparatus 200 without being combined. The display control apparatus 200 combines (performs the image connecting processing of) the two images (fisheye images) received from the imaging apparatus 100 to generate a single VR image (a combined image). The generated VR image is recorded in the recording medium 208 in a period from a recording start instruction to a recording end instruction.

The display unit 205 displays, on the basis of control by the CPU 201, an image, a GUI screen that configures a GUI (Graphical User Interface), or the like. The CPU 201 generates a display control signal according to a program and controls the units of the display control apparatus 200 to generate a video signal to be displayed on the display unit 205 and output the video signal to the display unit 205. The display unit 205 displays a video on the basis of the output video signal. A component included in the display control apparatus 200 is at most an interface for outputting a video signal to be displayed on the display unit 205. The display unit 205 may be an external monitor (a television, etc.).

The operation unit 206 (a receiving unit) is an input device for receiving user operation. The operation unit 206 is, for example, a character information input device such as a keyboard, a pointing device such as a mouse or a touch panel, a button, a dial, a joystick, a touch sensor, or a touch pad. The touch panel is an input device planarly configured to be superimposed on the display unit 205 and configured to output coordinate information corresponding to a touched position. The operation unit 206 may be, rather than the input device, a receiving device for receiving a signal from an external input device such as a remote controller.

The recording medium 208 such as a memory card, a CD, or a DVD can be attached to the storage medium I/F 207. The storage medium I/F 207 performs, on the basis of the control by the CPU 201, readout of data from the attached recording medium 208 and writing of data in the recording medium 208. The external I/F 209 is an interface connected to the external device by a wired cable or radio to perform input and output of a video signal and a sound signal. The communication I/F 210 is an interface for communicating with the external device, the Internet (NET) 211, and the like and performing transmission and reception of various data such as a file and a command.

The sound-output unit 212 is a functional unit that outputs sound of a moving image and music data, operation sound, ringtone, various kinds of notification sound, and the like. The sound-output unit 212 includes a sound output terminal 212a, to which an earphone or the like is connected, and a speaker 212b. However, the sound-output unit 212 may perform sound output through wireless communication or the like.

The posture-detecting unit 213 is a functional unit that detects a posture of the display control apparatus 200 with respect to the gravity direction and tilts of the posture with respect to axes of yaw, roll, and pitch. It is possible to discriminate, on the basis of the posture detected by the posture-detecting unit 213, whether the display control apparatus 200 is horizontally held, vertically held, directed upward, directed downward, set in an oblique posture, and the like. At least one of an acceleration sensor, a gyro sensor, a terrestrial magnetism sensor, an azimuth sensor, an altitude sensor, and the like can be used as the posture-detecting unit 213. A plurality of sensors of the acceleration sensor, the gyro sensor, the terrestrial magnetism sensor, the azimuth sensor, the altitude sensor, and the like can also be used in combination. The system timer 214 is a clocking unit that measures times used for various kinds of control and a time of an incorporated clock.

In this embodiment, the operation unit 206 includes the touch panel 206a. The CPU 201 detects operation on the touch panel 206a or states of the touch panel 206a explained below.

A finger or a pen not touching the touch panel 206a touches the touch panel 206a anew, that is, a start of a touch (hereinafter referred to as touch-down).

A state in which the finger or the pen is touching the touch panel 206a (hereinafter referred to as touch-on).

The finger or the pen is moving while keeping on touching the touch panel 206a (hereinafter referred to as touch-move).

The finger or the pen touching the touch panel 206a is separated from the touch panel 206a, that is, an end of the touch (hereinafter referred to as touch-up).

A state in which nothing is touching the touch panel 206a (hereinafter referred to as touch-off).

When the touch-down is detected, the touch-on is simultaneously detected. After the touch-down, usually, the touch-on is continuously detected unless the touch-up is detected. When the touch-move is detected, the touch-on is simultaneously detected. Even if the touch-on is detected, the touch-move is not detected if a touch position is not moving. When it is detected that all fingers or pens touching the touch panel 206a are separated from the touch panel 206a, the touch-off is detected.

These operations and states and a position coordinate of the touch of the finger or the pen on the touch panel 206a are notified to the CPU 201 through the internal bus. The CPU 201 determines, on the basis of the notified information, what kind of operation (touch operation) is performed on the touch panel 206a. Concerning the touch-move, a moving direction of the finger or the pen moving on the touch panel 206a is also determined for each of vertical components and horizontal components on the touch panel 206a on the basis of a change of the position coordinate. When the touch-move for a predetermined distance or more is detected, the CPU 201 determines that slide operation is performed. Operation for quickly moving the finger a certain degree of a distance while keeping on touching the touch panel 206a and separating the finger from the touch panel 206a while moving the finger is called flick. In other words, the flick is operation for quickly tracing on the touch panel 206a as if flicking the touch panel 206a with the finger. When the touch-move for the predetermined distance or more at predetermined speed or more is detected and the touch-up is detected during the touch-move, the CPU 201 determines that the flick is performed (determines that the flick is performed following the slide operation). Further, touch operation for simultaneously touching a plurality of parts (e.g., two points) and bringing touch positions of the plurality of parts close to one another is referred to as pinch-in. Touch operation for moving the touch positions away from one another is referred to as pinch-out. The pinch-out and the pinch-in are collectively referred to as pinch operation (or simply referred to as pinch). As the touch panel 206a, a touch panel of any type among various types such as a resistive film type, a capacitance type, a surface acoustic wave type, an infrared type, an electromagnetic induction type, an image recognition type, and an optical sensor type may be used. There are a type for detecting according to contact with a touch panel that the touch panel is touched and a type for detecting according to approach of a finger or a pen to the touch panel that the touch panel is touched. Any one of the types may be used.

<Processing Content of Imaging Apparatus 100>

Figure 3A:
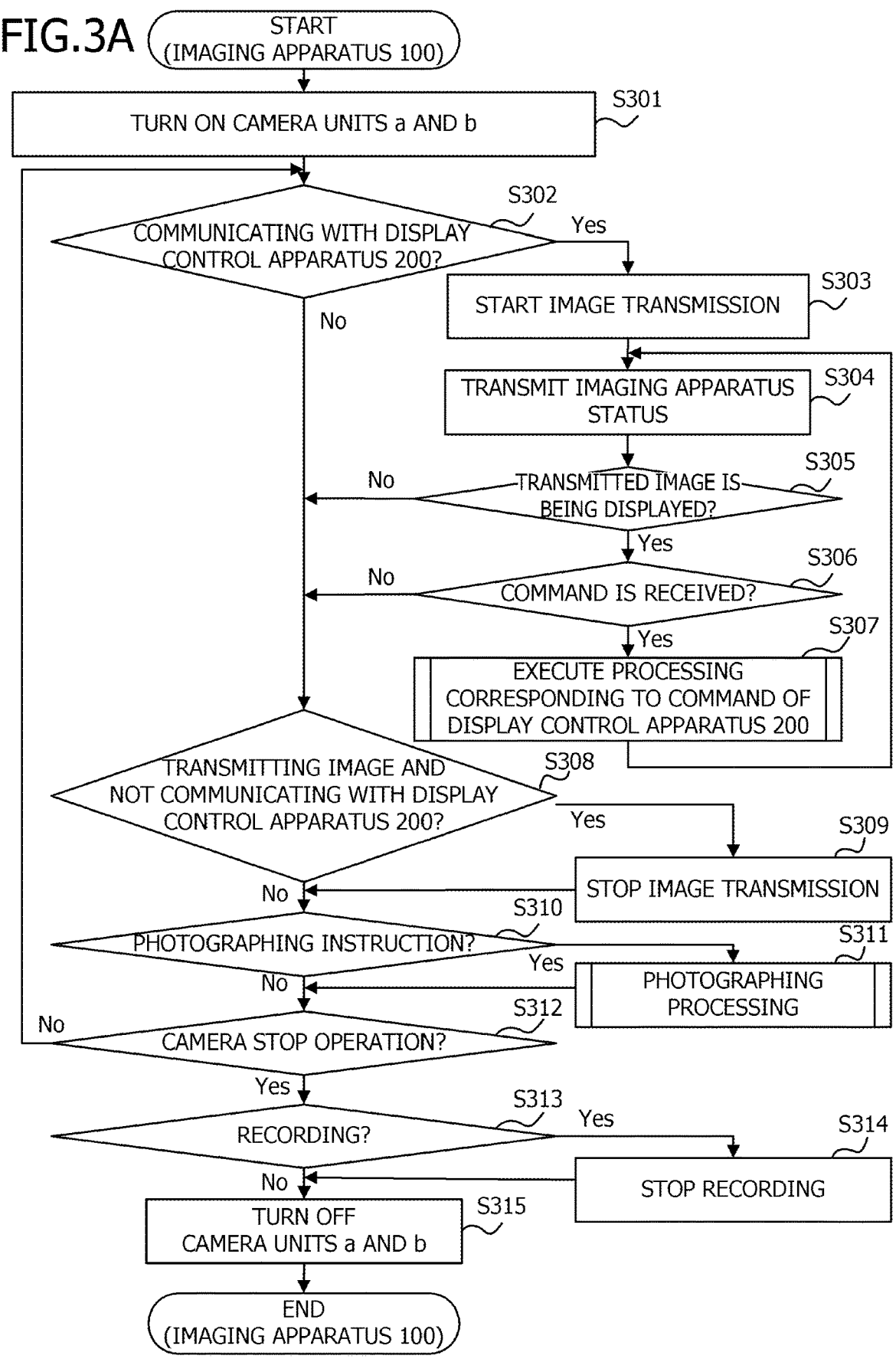
FIG. 3A is a flowchart showing an example of processing of the imaging apparatus according to the embodiment.
Figure 3B:
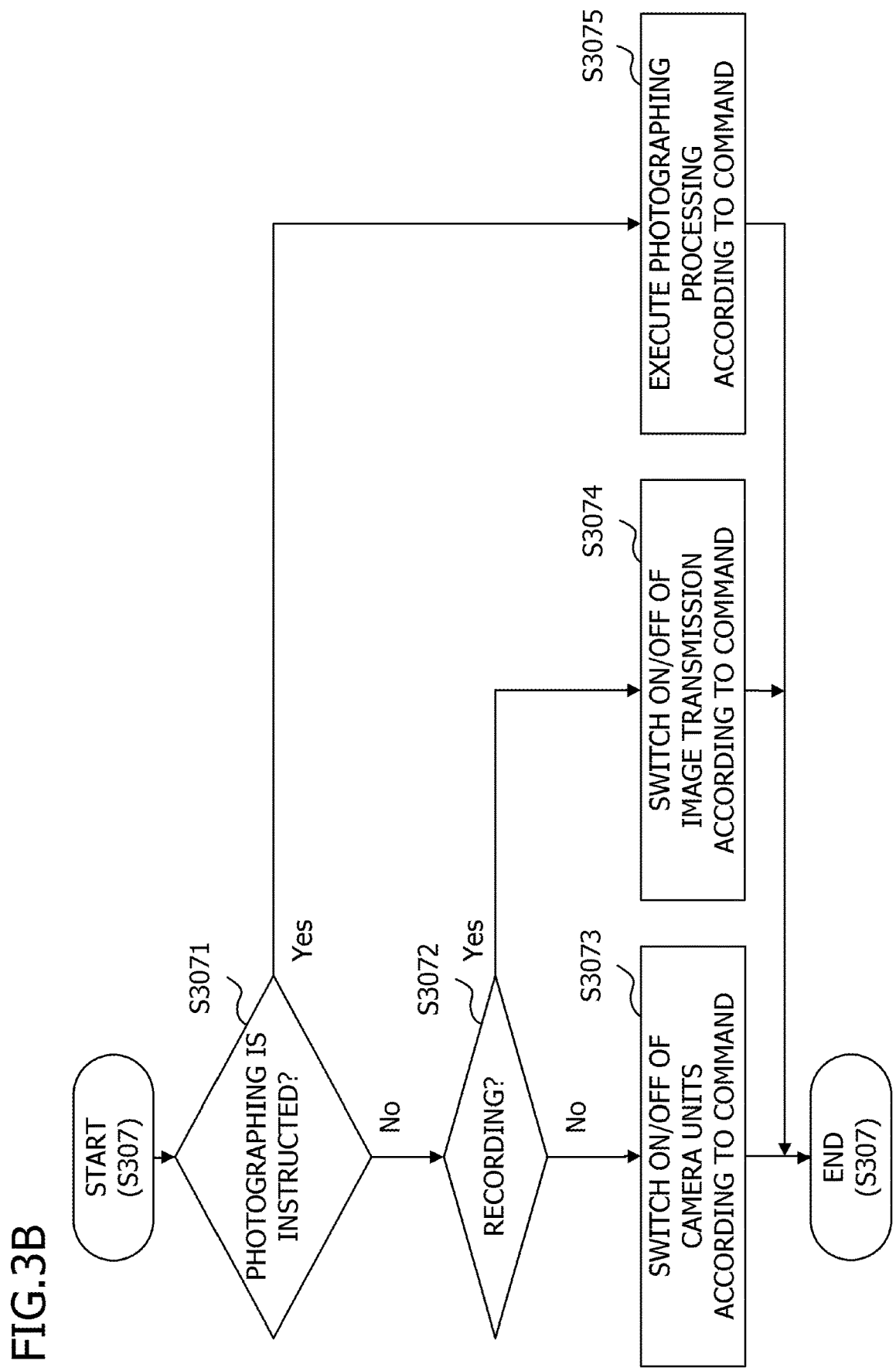
FIG. 3B is a flowchart showing an example of processing corresponding to a command of the imaging apparatus according to the embodiment.
Figure 3C:
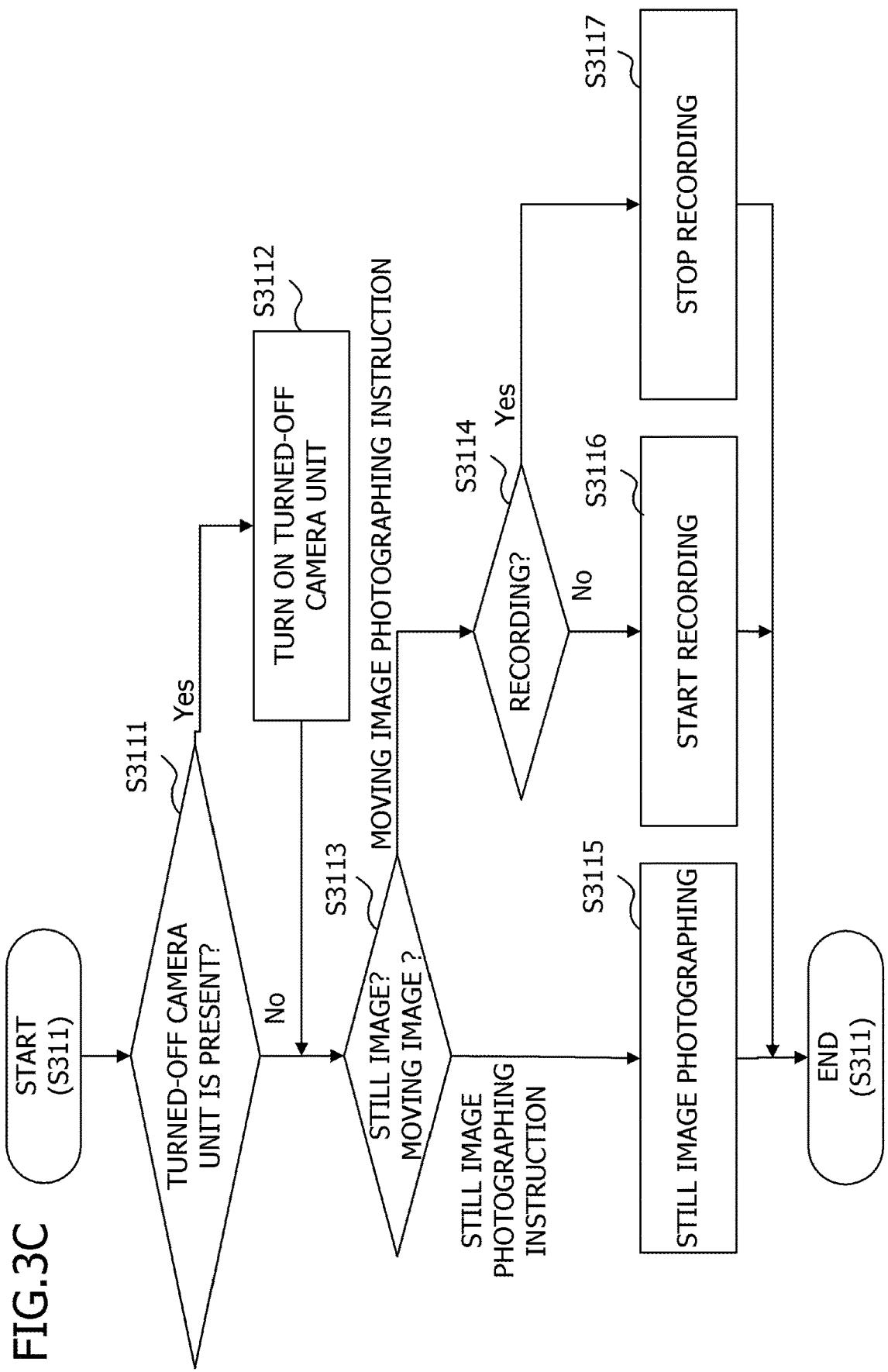
FIG. 3C is a flowchart showing an example of photographing processing of the imaging apparatus according to the embodiment.

FIGS. 3A to 3C are flowcharts showing examples of various kinds of processing performed in the imaging apparatus 100. The various kinds of processing include photographing processing (imaging processing) by operation of the imaging apparatus 100 itself and device control processing by a command received from the display control apparatus 200. The processing described above is realized by the system-control unit 50 developing, in the system memory 52, programs recorded in the nonvolatile memory 56 and executing the programs. Control shown in FIG. 3A is executed by the system-control unit 50. The processing shown in FIG. 3A is started when a power supply of the imaging apparatus 100 is turned on and the communication unit 54 or the connection I/F 25 is enabled.

First, the system-control unit 50 processes, with the image-processing unit 24, images captured by the camera units "a" and "b" and starts output of the images to the memory 32 (S301). The system-control unit 50 determines whether the imaging apparatus 100 is communicating with the display control apparatus 200 via the communication unit 54 (S302). When the imaging apparatus 100 is not communicating with the display control apparatus 200 (No in S302), the system-control unit 50 executes processing in step S312.

When the imaging apparatus 100 is communicating with the display control apparatus 200 (Yes in S302), the system-control unit 50 starts to transmit a real-time VR image accumulated in the memory 32 from the communication unit 54 as a live video (S303). Subsequently, the system-control unit 50 transmits an imaging apparatus status (state) to the display control apparatus 200 (S304). The imaging apparatus status includes ON/OFF of the camera units, ON/OFF of photographing, ON/OFF of recording, and ON/OFF of image transmission (video transmission) to the display control apparatus 200. The imaging apparatus status includes information such as presence or absence of power feed to the imaging unit 22, presence or absence of power feed to the A/D converter 23, and ON/OFF of image processing. ON of the camera units is a state in which at least the power feed to the imaging unit 22 is present and the photographing is ON. The image transmission may be either ON or OFF. OFF of the camera units is a state in which at least the photographing is OFF (the image transmission is also OFF). The power feed to the imaging unit 22 may be either present or absent. Subsequently, the system-control unit 50 determines whether the live video is being displayed on the display control apparatus 200 (S305). When the live video is not being displayed (No in S305), the system-control unit 50 executes processing in step S308. The system-control unit 50 may acquire information from the display control apparatus 200 using wireless communication or the like to determine whether the live video is being displayed. The system-control unit 50 may perform the determination in step S305 according to whether the imaging apparatus 100 is transmitting the live video to the display control apparatus 200.

When the live video is being displayed (Yes in S305), the system-control unit 50 determines whether a command is received from the display control apparatus 200 (S306). When a command is not received (No in S306), the system-control unit 50 executes the processing in step S304. When a command is received (Yes in S306), the system-control unit 50 executes processing corresponding to the command of the display control apparatus 200 (S307). Details of the processing in step S307 are explained below.

Subsequently, in step S308, the system-control unit 50 determines whether "the imaging apparatus 100 is transmitting the live video to the outside and is not communicating with the display control apparatus 200". When the imaging apparatus 100 is transmitting the live video to the outside and is not communicating with the display control apparatus 200" (Yes in S308), the system-control unit 50 stops the transmission of the live video (S309).

Subsequently, in step S310, the system-control unit 50 determines whether a photographing instruction is given on the basis of operation of the imaging apparatus 100. The operation of the imaging apparatus 100 is, for example, operation by pressing of the shutter button 61. When the photographing instruction is received (Yes in S310), the system-control unit 50 executes photographing processing (S311) shown in FIG. 3B. Details of the photographing processing in step S311 are explained below.

Subsequently, in step S312, the system-control unit 50 determines whether camera stop operation is performed. When the camera stop operation is performed (Yes in S312), if the imaging apparatus 100 is performing recording (Yes in S313), the system-control unit 50 stops the recording (S314) and thereafter turns off the camera units (S315).

<<Processing Corresponding to Command (S307)>>

FIG. 3B is a flowchart showing details of the processing in step S307. In this embodiment, an example is explained in which the imaging apparatus 100 receives commands concerning photographing processing, switching processing of ON/OFF of the camera units, and switching processing of ON/OFF of image transmission to the display control apparatus 200. Commands received by the imaging apparatus 100 are not limited to the above and may be, for example, a command for changing the direction of the camera units and a command for changing a state of the imaging apparatus status explained above.

A command concerning the photographing processing is a command (a photographing instruction) given in photographing instruction processing (S408) of the display control apparatus 200 explained below. A command concerning turning-on of the camera units and turning-on of the image transmission is a command given in changing processing (S410) for a display range of the display control apparatus 200 explained below. Further, a command concerning turning-off of the camera unit and turning-off of the image transmission is a command given in power saving processing (S413) of the display control apparatus 200 explained below.

The display control apparatus 200 instructs the imaging apparatus 100 to switch ON/OFF of the camera units or ON/OFF of the image transmission according to whether the imaging apparatus 100 is performing recording. This is because, when the camera units are turned on, since the power supply of the imaging apparatus 100 (power feed to the camera units) is already on if the imaging apparatus 100 is performing recording, only the image transmission has to be turned on. Further, this is because, when the camera units are turned off (power saving processing), if the imaging apparatus 100 is performing recording, power saving of the camera units are achieved by turning off only the image transmission while maintaining a recording state. Similarly, processing of the imaging apparatus 100 is divided according to whether the imaging apparatus 100 is performing recording. However, the imaging apparatus 100 may perform the processing according to the command explained above regardless of whether the imaging apparatus 100 is performing recording. The processing corresponding to the command in the imaging apparatus 100 (S307) is explained below.

The system-control unit 50 determines whether the received command is a photographing instruction (S3071). When the received command is not the photographing instruction (No in S3071), the system-control unit 50 performs the following processing according to whether the imaging apparatus 100 is performing recording. When the imaging apparatus 100 is not performing recording (No in S3072), the system-control unit 50 performs switching of ON/OFF of a part of the camera units according to the command of the display control apparatus 200 (S3073). When the imaging apparatus 100 is performing recording (Yes in S3072), the system-control unit 50 performs, according to the command from the display control apparatus 200, switching of ON/OFF of transmission of a VR image (transmission of a live video) obtained by combining images output from a part of the camera units among the plurality of camera units (S3074). When the received command is the photographing instruction (Yes in S3071), the system-control unit 50 executes photographing processing according to the command of the display control apparatus 200 (S3075). The photographing instruction in this embodiment includes a still image photographing instruction or a moving image recording start instruction/stop instruction. The photographing processing in step S3075 may be the same as the photographing processing in step S311. After the processing in steps S3073 to S3075, the system-control unit 50 executes the processing in step S304 shown in FIG. 3A.

<<Photographing Processing (S311)>>

FIG. 3C is a flowchart showing an example of the photographing processing (S311) explained above. In this processing, still image photographing or moving image photographing (a recording start or a recording stop) is performed according to a still image photographing instruction or a moving image photographing instruction by operation of the imaging apparatus 100 itself. When receiving the still image photographing instruction, the system-control unit 50 performs still image photographing processing. When receiving the moving image photographing instruction, the system-control unit 50 performs recording start processing/recording stop processing according to whether the imaging apparatus 100 is performing recording. Specifically, the system-control unit 50 performs the recording stop processing if the imaging apparatus 100 is already performing recording and performs the recording start processing if the imaging apparatus 100 is not performing recording. When receiving the still image photographing instruction during recording, the imaging apparatus 100 performs the still image photographing processing in the same manner as explained above. Details of processing in the photographing processing (S311) are explained below.

The system-control unit 50 determines whether a turned-off camera unit is present (S3111). When a turned-off camera unit is present (Yes in S3111), the system-control unit 50 turns on the turned-off camera unit (S3112).

Subsequently, the system-control unit 50 determines whether instruction content of the photographing processing is the still image photographing instruction or the moving image photographing instruction (S3113). In the case of the still image photographing instruction, the system-control unit 50 executes still image photographing (S3115). In the case of the moving image photographing instruction, the system-control unit 50 determines whether the imaging apparatus 100 is performing recording (S3114). When the imaging apparatus 100 is not performing recording (No in S3114), the system-control unit 50 starts recording (S3116). When the imaging apparatus 100 is performing recording (Yes in S3114), the system-control unit 50 executes a recording stop (S3117). Data acquired by the photographing processing is recorded in the memory 32.

<Processing Content of Display Control Apparatus 200>

Figure 4A:
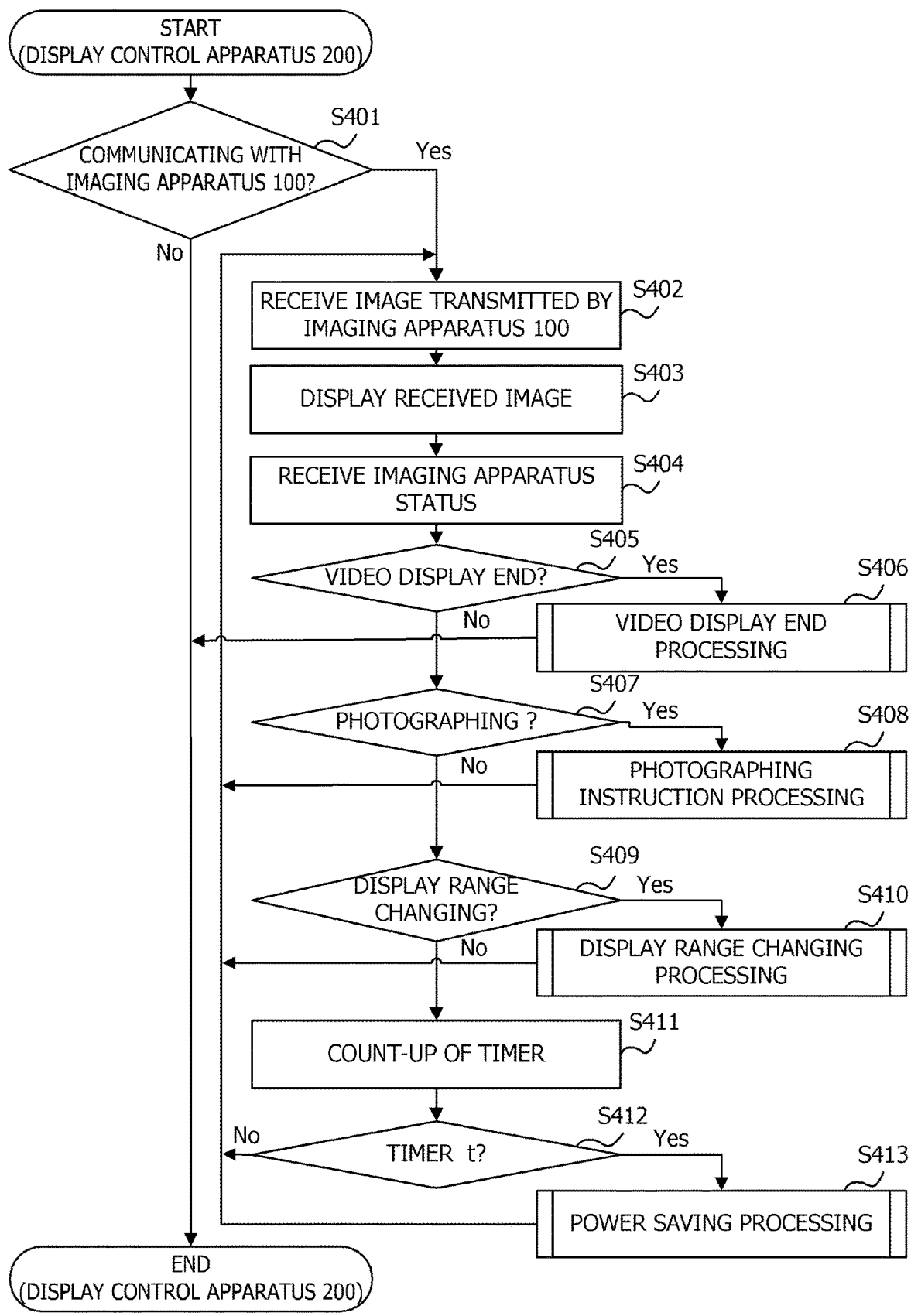
FIG. 4A is a flowchart showing an example of processing of the display control apparatus according to the embodiment.

FIGS. 4A to 4G are flowcharts showing an example of display control processing in the display control apparatus 200. This processing is realized by the CPU 201 developing, in the memory 202, a program recorded in the nonvolatile memory 203 and executing the program. Processing shown in FIG. 4A is started when the power supply of the display control apparatus 200 is turned on and the communication I/F 210 or the external I/F 209 is enabled.

First, the CPU 201 determines whether the display control apparatus 200 is communicating with the imaging apparatus 100 (S401). When the communication is detected according to data reception of the communication I/F 210 (Yes in S401), the CPU 201 executes the following processing. First, the CPU 201 receives VR image data (a VR image) from the communication I/F 210 (S402). The CPU 201 performs, with the image-processing unit 204, segmentation of an image of a part of a range of the VR image (a combined image) from the received VR image data and displays the segmented image on the display unit 205 (S403). Subsequently, the CPU 201 receives the imaging apparatus status explained above transmitted from the imaging apparatus 100 (S404) and stores the imaging apparatus status in the memory 32.

Subsequently, the CPU 201 detects presence or absence of an operation instruction of the display control apparatus 200. Specifically, the CPU 201 detects, as an operation instruction, button operation, touch operation, or the like of the operation unit 206 or the touch panel 206a. In the following explanation, the CPU 201 detects presence or absence of a video display end operation instruction (S405), presence or absence of a photographing operation instruction (S407), and presence or absence of a change instruction for a display range (S409).

First, when detecting the video display end operation instruction (Yes in S405), the CPU 201 performs end processing for live video display in the display control apparatus 200 (S406). Subsequently, when detecting the photographing operation instruction (Yes in S407), the CPU 201 performs photographing instruction processing for transmitting a command corresponding to the operation instruction to the imaging apparatus 100 (S408). In this embodiment, the CPU 201 transmits a command including any of one a still image photographing instruction and a moving image photographing start instruction/stop instruction to the imaging apparatus 100. Further, when detecting the change instruction for the display range in the display control apparatus 200 (Yes in S409), the CPU 201 performs, with the operation-image-processing unit 204, range changing processing for the segmented image (S410). Details of the processing in step S406, S408, and S410 are explained below.

In step S411, when button operation or touch operation is not performed (in the case of no operation), the CPU 201 starts count-up of a timer using the system timer 214. The CPU 201 determines whether a time of no operation has continued for a predetermined threshold T or more (S412). The threshold T can be set to, for example, one minute but is not particularly limited. As explained below, the threshold T may be changeable. When the time of no operation is smaller than the threshold T (No in S412), the CPU 201 executes the processing in step S402 again. When the time of no operation is equal to or larger than the threshold T (equal to or longer than a predetermined time) (Yes in S412), the CPU 201 performs power saving processing (S413). In this embodiment, as the power saving processing, camera units other than a camera unit that captures an image in a display range among a plurality of images forming a VR image is switched to an OFF state. Alternatively, when the imaging apparatus 100 is performing recording, the plurality of camera units are not changed from an ON state and images output by the camera units other than the camera unit that captures the image in the display range are not combined into a VR image of a live image. In this way, concerning the camera units that capture images outside the display range, image transmission from the imaging apparatus 100 to the display control apparatus 200 is turned off. Details of the power saving processing are explained below.

<<End Processing for Video Display (S406)>>

Figure 4B:
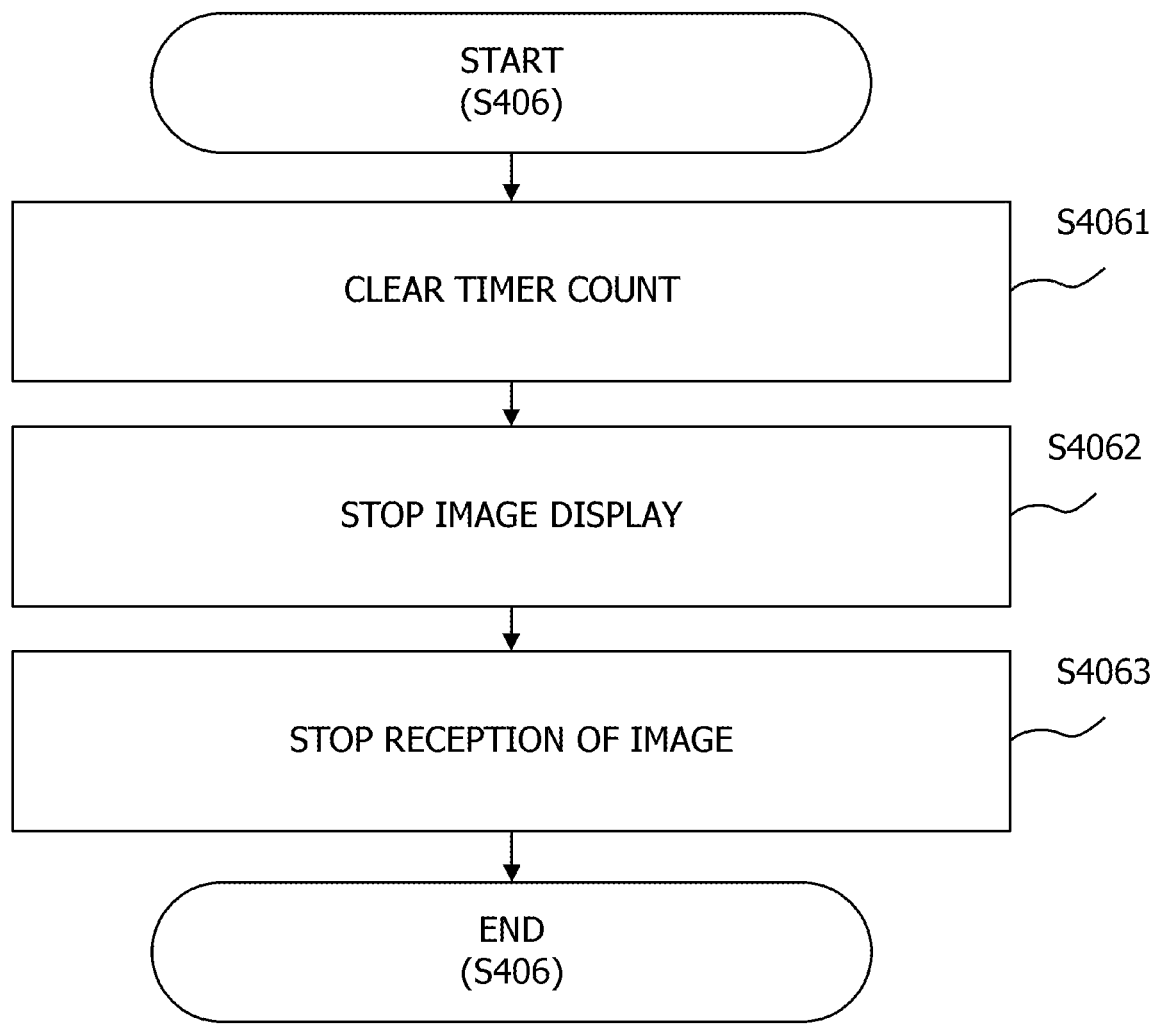
FIG. 4B is a flowchart showing an example of display ending processing of the display control apparatus according to the embodiment.

FIG. 4B is a flowchart showing an example of the end processing for the live video display (S406) in this embodiment. Specifically, the CPU 201 clears the timer count of the memory 202 to zero (S4061), stops the display on the display unit 205 (S4062), stops the video reception, and suspends the communication with the imaging apparatus 100 (S4063) to perform the end processing for the live video display. As explained above, when the imaging apparatus 100 is "transmitting the live video to the outside and is not communicating with the display control apparatus 200" (Yes in S308). Therefore, the system-control unit 50 stops the transmission of the live video to the display control apparatus 200 (S309).

<<Photographing Instruction Processing (S408)>>

Figure 4C:
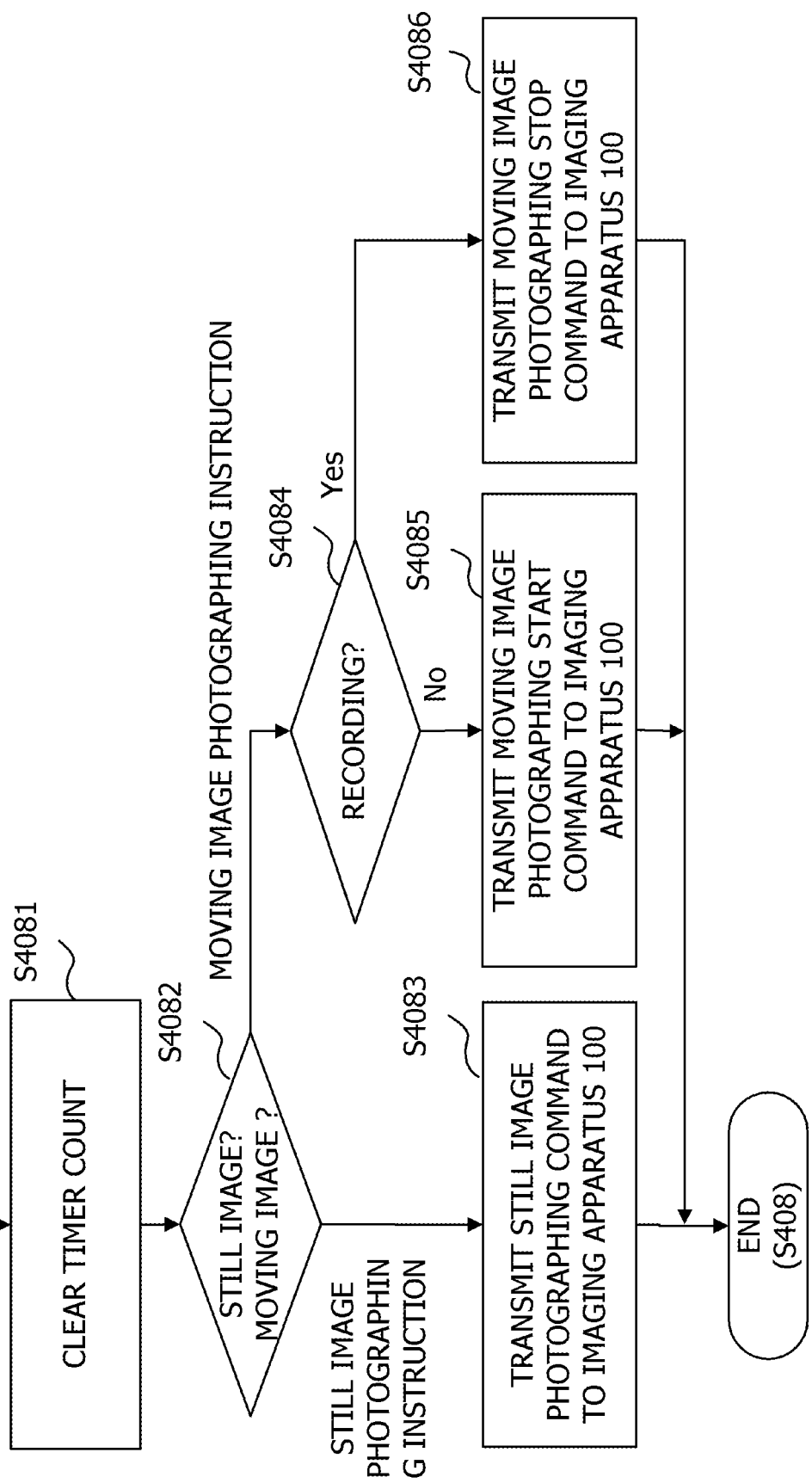
FIG. 4C is a flowchart showing an example of photographing processing of the display control apparatus according to the embodiment.

FIG. 4C is a flowchart showing an example of the photographing instruction processing (S408) in this embodiment. In this embodiment, an example is explained in which the display control apparatus 200 transmits, according to a still image photographing instruction or a moving image photographing instruction, a still image photographing command or a moving image photographing start/stop command to the imaging apparatus 100. In this embodiment, the display control apparatus 200 instructs, according to the moving image photographing instruction, the imaging apparatus 100 to perform a moving image photographing start if the imaging apparatus 100 is performing recording and perform a moving image photographing stop if the imaging apparatus 100 is not performing recording. The display control apparatus 200 may give the moving image photographing start/stop command regardless of whether the imaging apparatus 100 is performing recording. Details of the photographing instruction processing according to this embodiment are explained below.

First, the CPU 201 clears the timer count of the memory 202 to zero (S4081). The CPU 201 determines whether content of a photographing instruction is the moving image photographing instruction (S4082). When the content of the photographing instruction is the still image photographing instruction, the CPU 201 transmits a still image photographing command to the imaging apparatus 100 (S4083). When the content of the photographing instruction is the moving image photographing instruction, the CPU 201 determines whether the imaging apparatus 100 is performing recording (S4084). When the imaging apparatus 100 is not performing recording (No in S4084), the CPU 201 transmits a moving image photographing start command to the imaging apparatus 100 (S4085). When the imaging apparatus 100 is performing recording (Yes in S4084), the CPU 201 transmits a moving image photographing stop command to the imaging apparatus 100 (S4086). After the processing in steps S4083, S4085, and S4086, the CPU 201 executes the processing in step S402 shown in FIG. 4A again.

<<Changing Processing for Display Range (S410)>>

Figure 4D:
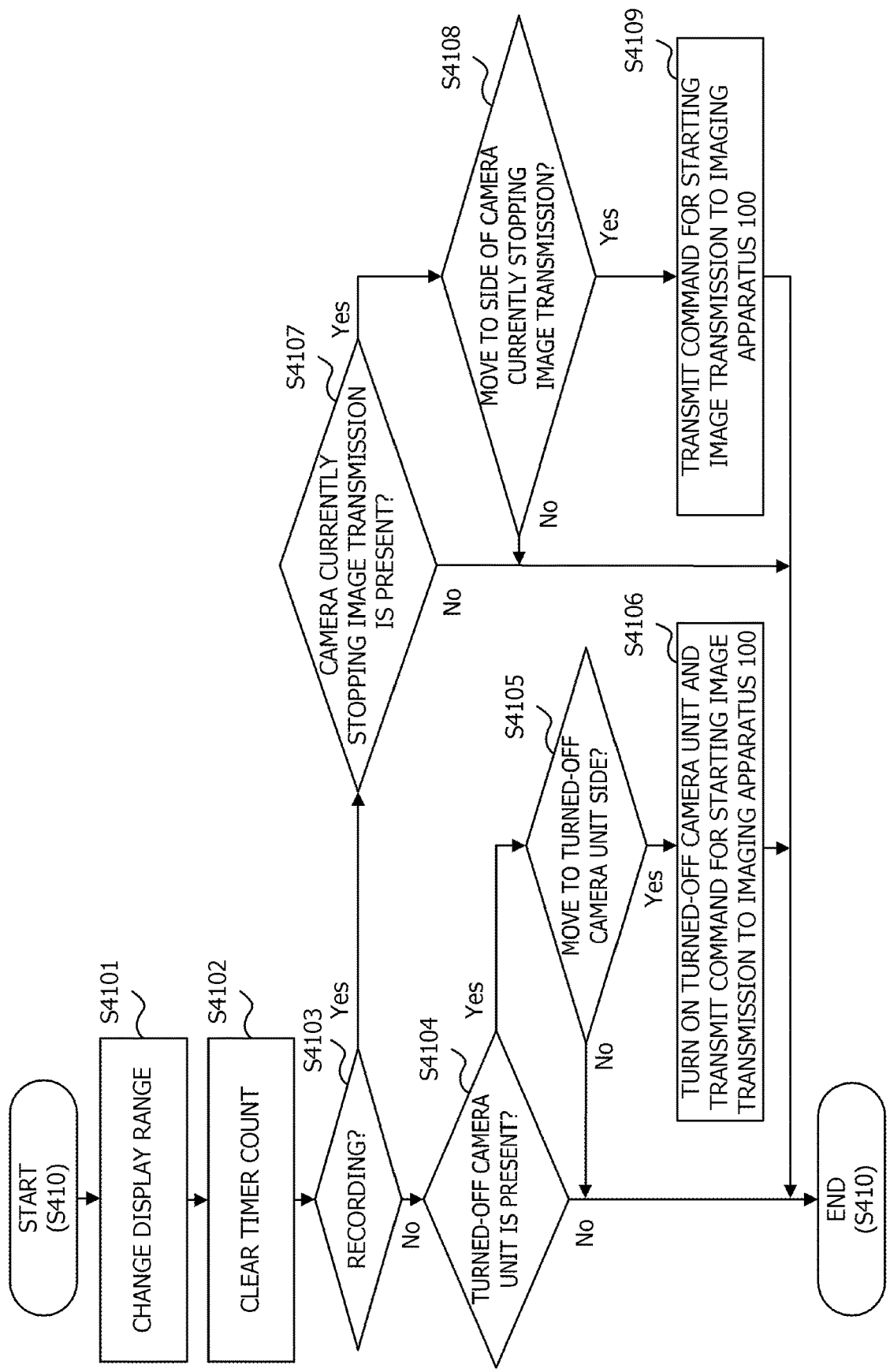
FIG. 4D is a flowchart showing an example of display changing processing of the display control apparatus according to the embodiment.

FIG. 4D is a flowchart showing an example of the changing processing for the display range according to this embodiment. In this processing, when the display range is changed by operation of the display control apparatus 200 in a state in which a transmitted image of the imaging apparatus 100 is displayed, the display control apparatus 200 transmits a command for turning on the camera units of the imaging apparatus 100 according to necessity. Specifically, when an imaging range in a turned-off camera unit among the camera units of the imaging apparatus 100 is included in the display range after the change, the display control apparatus 200 transmits, to the imaging apparatus 100, a command for turning on the turned-off camera unit and starting image transmission. Further, when an imaging range in a turned-on camera unit among the camera units of the imaging apparatus 100 is not included in the display range after the change, the display control apparatus 200 may transmit, to the imaging apparatus 100, a command for turning off the turned-on camera unit and stopping the image transmission. Since all the camera units are on when the camera units are performing recording, the display control apparatus 200 transmits, to the imaging apparatus 100, a command for starting transmission of a VR image obtained by combining images output from the camera units, imaging ranges of which are included in the display range after the change. Further, the display control apparatus 200 may transmit, to the imaging apparatus 100, a command for stopping transmission of images output from the camera units, the imaging ranges of which are not included in the display range after the change, by not combining the images output from the camera units, the imaging ranges of which are not included in the display range after the change, into a VR image. Details of the changing processing for the display range according to this embodiment are explained below.

First, the CPU 201 changes, with the operation-image-processing unit 204, the display range of the VR image (the combined image) transmitted from the imaging apparatus 100 in step S303. The CPU 201 segments, from the VR image, a portion corresponding to a display range corresponding to operation and live view-displays the portion on the display unit 205 (S4101). The CPU 201 clears the timer count of the memory 202 to zero (S4102). Further, the CPU 201 determines whether the imaging apparatus 100 is performing recording (S4103).

When the imaging apparatus 100 is not performing recording in step S4103 (No in S4103), the CPU 201 determines presence or absence of a turned-off camera unit (S4104). When a terminal end is present in the VR image received from the imaging apparatus 100, the CPU 201 determines that a turned-off camera unit is present. For example, when the camera unit "b" is off in the imaging apparatus 100, the imaging apparatus 100 transmits, to the display control apparatus 200, a VR image formed by only the image 221 output from the camera unit "a". As shown in FIG. 2D, a terminal end 225 and a terminal end 226 are present in the VR image formed by only the image 221. Therefore, the CPU 201 determines that a turn-off camera unit is present. When a turned-off camera unit is present (Yes in S4104), the CPU 201 determines whether the display range is moved to include an imaging range of the turned-off camera unit (S4105). When a display range 224 moves to a display range 227 and the display range 227 is not filled by the VR image received from the imaging apparatus 100 as shown in FIG. 2D, the CPU 201 determines that the display range has been moved to the imaging range of the turned-off camera unit. When the display range is moved to be included in the photographing range of the turned-off camera unit (Yes in S4105), the CPU 201 transmits a command for turning on the turned-off camera unit to the imaging apparatus 100 (S4106). In this embodiment, the camera units are only the two camera units "a" and "b". Therefore, for example, when the camera unit "a" is on and an image output by the camera unit "a" is transmitted to the display control apparatus 200, the camera "b" is uniquely determined as a turned-off camera. The command explained above is given via, for example, the external I/F 209 or the communication I/F 210. When the display range is included in an imaging range of a turned-on camera unit but it is predicted that the display range is highly likely to be included in the imaging range of the turned-off camera unit if the display range has been moved to near an end of the imaging range of the turned-on camera unit and the movement continues, the CPU 201 may transmit a command for turning on the turned-off camera unit to the imaging apparatus 100. Alternatively, for example, when the distance between a coordinate of a center position, an entire position, or the like of the display range and a terminal end of an image of the turned-on camera unit is equal to or smaller than a predetermined value, the CPU 201 may transmit a command for turning on the turned-off camera unit to the imaging apparatus 100. In S4106, the CPU 201 may transmit, to the imaging apparatus 100, a command for turning off a camera unit that photographs an imaging range not including the display range at all when the display range has been moved.

When the imaging apparatus 100 is performing recording in step S4103 (Yes in S4103), the CPU 201 determines presence or absence of a camera unit currently stopping image transmission (S4107). When a terminal end is present in the VR image received from the imaging apparatus 100, the CPU 201 determines that a camera unit currently stopping image transmission is present. For example, when the camera unit "b" is currently stopping image transmission in the imaging apparatus 100, the imaging apparatus 100 transmits, to the display control apparatus 200, as a live video, a VR image formed by only the image 221 output from the camera unit "a". As shown in FIG. 2D, the terminal end 225 and the terminal end 226 are present in the VR image formed by only the image 221. Therefore, the CPU 201 determines that a camera unit currently stopping image transmission is present. When a camera unit currently stopping image transmission is present (Yes in S4107), the CPU 201 determines whether the display range is moved to include an imaging range of the camera unit currently stopping image transmission (S4108). When the display range 224 moves to the display range 227 and the display range 227 is not filled by the VR image received from the imaging apparatus 100 as shown in FIG. 2D, the CPU 201 determines that the display range moves to the imaging range of the camera unit currently stopping image transmission. When the display range is moved to be included in the imaging range of the camera unit currently stopping image transmission (Yes in S4108), the CPU 201 transmits, to the imaging apparatus 100, a command for starting transmission of an image output from the camera unit currently stopping image transmission (S4109). When the display range is included in the imaging range of the camera unit currently executing image transmission but it is predicted that the display range is highly likely to be included in the imaging range of the camera unit currently stopping image transmission if the display range moves to near an end of the imaging range of the camera unit currently executing image transmission and the movement continues, the CPU 201 may transmit, to the imaging apparatus 100, a command for starting image transmission of the camera unit currently stopping image transmission. In S4109, the CPU 201 may transmit, to the imaging apparatus 100, a command for turning off image transmission of a camera unit that photographs an imaging range not including the display range when the display range has been moved. The command explained above is given, for example, via the external I/F 209 or the communication I/F 210. After this processing, the CPU 201 performs the processing in step S402 shown in FIG. 4A again.

<<Power Saving Processing (S413)>>

Figure 4E:
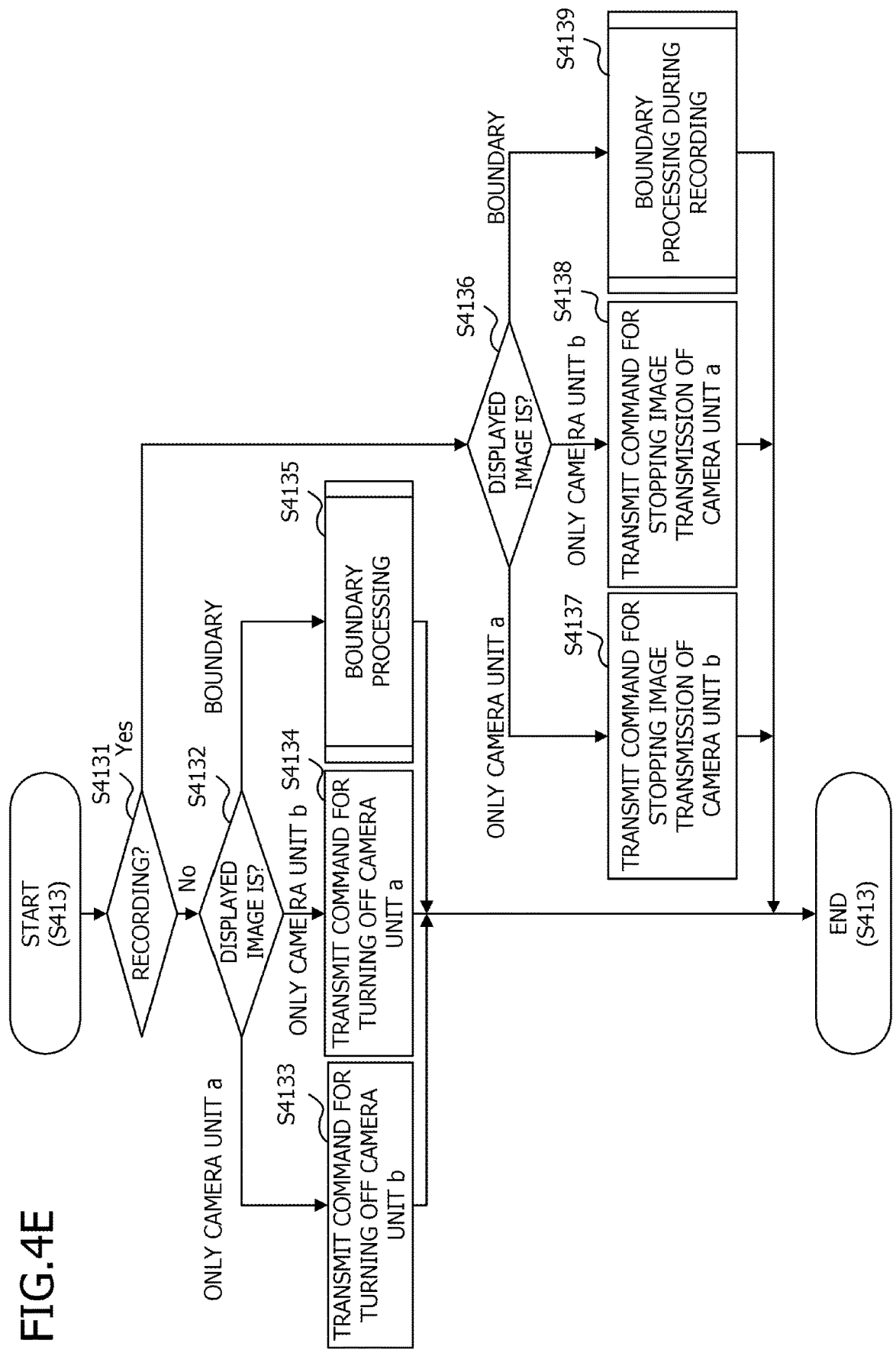
FIG. 4E is a flowchart showing an example of power saving processing of the display control apparatus according to the embodiment.

FIG. 4E is a flowchart showing an example of the power saving processing (S413) according to this embodiment. In this processing, the CPU 201 performs the power saving processing when the time of no operation is equal to or larger than the threshold T. Specifically, when a part of a range of a VR image (a combined image) is displayed on the display unit 205, the display control apparatus 200 transmits a command for turning off a camera unit of the imaging apparatus 100 that captures an image in a range not displayed on the display unit 205. When the imaging apparatus 100 is performing recording, the display control apparatus 200 transmits a command for turning off only the image transmission without turning off the camera unit that photographs the imaging range not including the display range. When images captured by the plurality of camera units are included in the display range, the display control apparatus 200 determines, according to the display range, a camera unit to be turned off. Details of the power saving processing according to this embodiment are explained below.

First, the CPU 201 determines whether the imaging apparatus 100 is performing recording (S4131).

When the imaging apparatus 100 is not performing recording in step S4131 (No in step S4131), the CPU 201 determines, according to a display range of a VR image displayed on the display unit 205, processing to be executed (S4132). The CPU 201 compares coordinate information indicating an imaging range of the camera units received together with the VR image and a coordinate of the display range. When only an image captured by the camera unit "a" is displayed on the display unit 205, the CPU 201 transmits a command for turning off the camera unit "b" functioning as a camera unit other than the camera unit "a" to the imaging apparatus 100 (S4133). When only an image captured by the camera unit "b" is displayed on the display unit 205, the CPU 201 transmits a command for turning off the camera unit "a" functioning as a camera unit other than the camera unit "b" to the imaging apparatus 100 (S4134). When videos (boundaries) of both the camera units "a" and "b" are displayed on the display unit 205, the CPU 201 performs boundary processing (S4135). Details of the boundary processing are explained below.

When the imaging apparatus 100 is performing recording in step S4131 (Yes in S4131), the CPU 201 determines, according to the display range of the VR image displayed on the display unit 205, processing to be executed (S4136). The CPU 201 compares coordinate information indicating the imaging range of the camera units received together with the VR image and the coordinate of the display range. When only an image captured by the camera unit "a" is displayed on the display unit 205, the CPU 201 transmits, to the imaging apparatus 100, a command for stopping transmission of a live video obtained by combining images output from the camera unit "b" functioning as a camera unit other than the camera unit "a" (S4137). When only an image captured by the camera unit "b" is displayed on the display unit 205, the CPU 201 transmits, to the imaging apparatus 100, a command for stopping transmission of a live video obtained by combining images output from the camera unit "a" functioning as a camera unit other than the camera unit "b" (S4138). When videos of both the cameras "a" and "b" are included in the display unit 205, the CPU 201 performs boundary processing during recording (S4139). Details of the boundary processing during recording are explained below. After the processing in steps S4133 to S4135 and S4137 to S4139, the CPU 201 executes step S402 again.

<<Boundary Processing (S4135)>>

FIG. 4F is a flowchart showing an example of the boundary processing explained above (S4135). When the boundary processing is executed, the CPU 201 determines whether a display size of an image captured by the camera unit "a" is equal to or larger than a display size of an image captured by the camera unit "b" in the display range of the VR image (S41351).

When the image of the camera unit "b" occupies a larger area in the display range than the image of the camera unit "a" (No in S41351), the CPU 201 changes the display range of the display unit 205 to be included in only the image captured by the camera unit "b" in a live video (S41352) and transmits a command for turning off the camera "a" to the imaging apparatus 100 (S41353). When the image of the camera unit "a" occupies a larger area in the display range than the image of the camera unit "b" (Yes in S41351), the CPU 201 changes the display range of the display unit 205 to be included in only the image captured by the camera unit "a" in the live image (S41354) and transmits a command for turning off the camera unit "b" to the imaging apparatus 100 (S41355).

<<Boundary Processing During Recording (S4139)>>

Figure 4G:
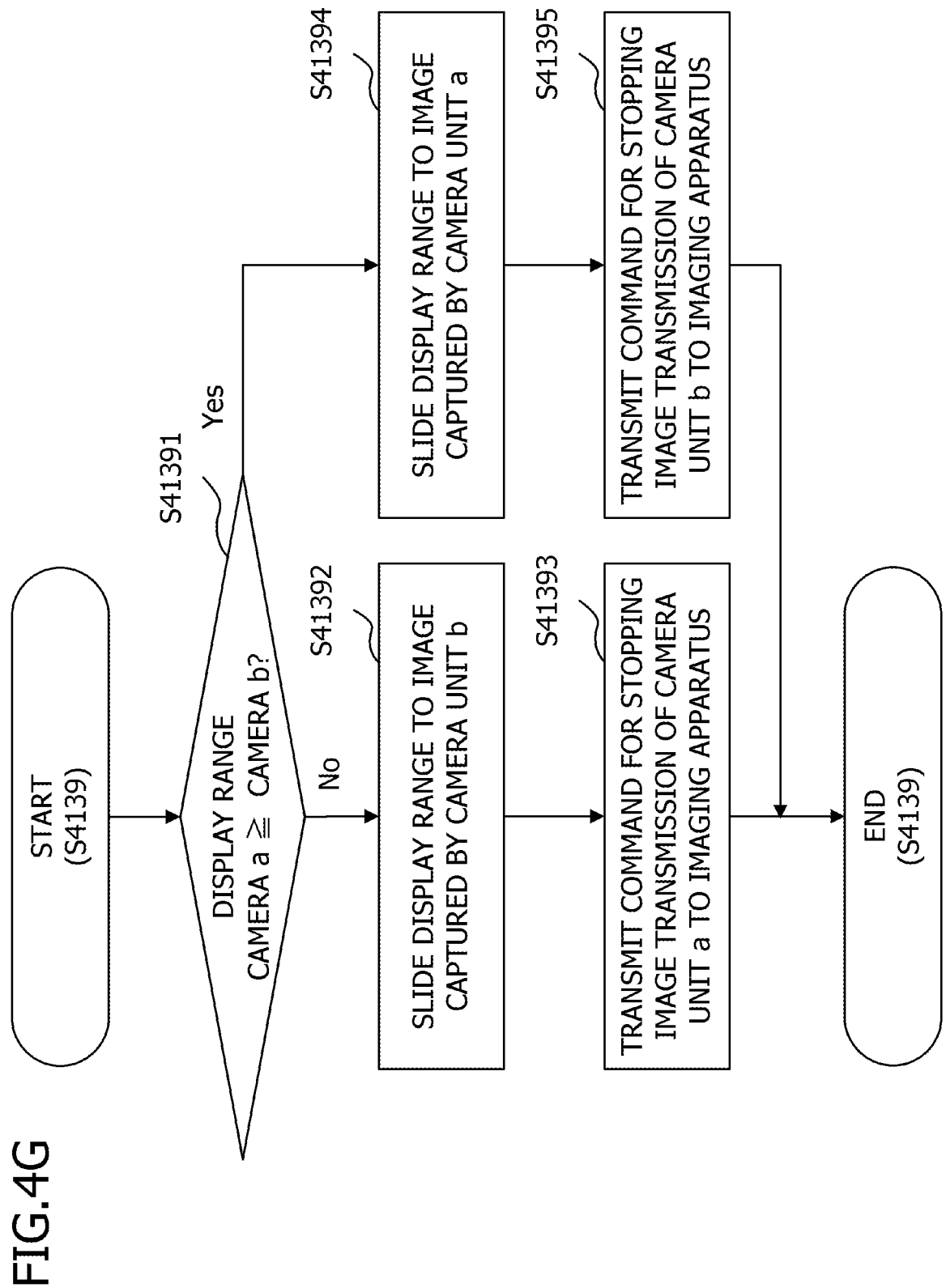
FIG. 4G is a flowchart showing an example of the boundary processing of the display control apparatus according to the embodiment.

FIG. 4G is a flowchart showing an example of the boundary processing during recording explained above (S4139). When the boundary processing during recording is executed, the CPU 201 determines whether a display size of an image captured by the camera unit "a" is equal to or larger than a display size of an image captured by the camera unit "b" in the display range of the VR image (S41391).

When the image of the camera unit "b" occupies a larger area in the display range than the image of the camera unit "a" (No in S41391), the CPU 201 changes a display range of the display unit 205 to be included in only the image captured by the camera unit "b" in a live video (S41392). The CPU 201 transmits a command for stopping image transmission of the camera unit "a" to the imaging apparatus 100 (S41393). When the image of the camera unit "a" occupies a larger area in the display range than the image of the camera unit "b" (Yes in S41391), the CPU 201 changes the display range of the display unit 205 to be included in only the image captured by the camera unit "a" in the live image (S41394). The CPU 201 transmits a command for stopping image transmission of the camera unit "b" to the imaging apparatus 100 (S41395).

After the processing in steps S41393 and S41395, the CPU 201 may transmit, to the imaging apparatus 100, a command for resuming the image transmission of the camera units "a" and "b" according to a predetermined condition. Examples of the predetermined condition include a condition that a user instruction input for bringing images captured by the camera units "a" and "b" into the display range continues for a predetermined period or more and a condition that the instruction input is repeated twice or more in the predetermined period.

<Reduction Processing for Start Time>

In this embodiment, in order to reduce a delay time involved in a start of the camera units, a stop target function of the imaging apparatus 100 is changed according to the position of the display range. Specifically, any one of a stop of power feed to the imaging unit 22 of the imaging apparatus 100, a stop of power feed to the A/D converter 23, and a stop of image processing and image transmission processing to the display control apparatus 200 is performed according to where in a VR image the display range is located. In this embodiment, an example is explained in which two rectangular ranges are provided as a predetermined range. However, the number and shapes of ranges are not particularly limited. Determination concerning whether the display range is within the predetermined range is performed according to, for example, a coordinate of a segmentation display range such as a center position or a display range entire position of the segmentation display range. An example is explained in which the reduction processing for the start time is performed in the display control apparatus 200. However, this processing may be performed in the imaging apparatus 100.

Figure 5A:
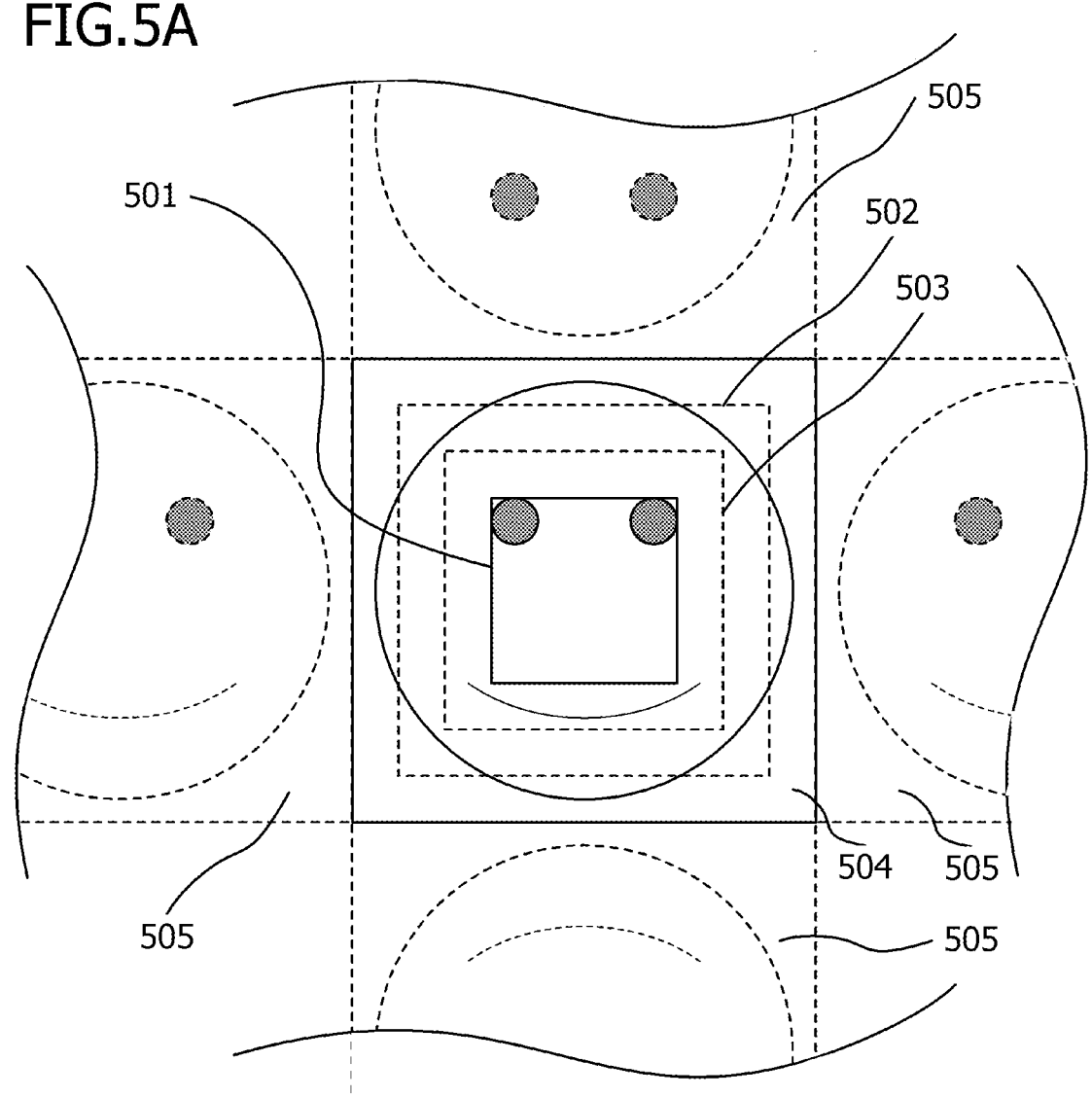
FIG. 5A is a diagram showing an example of a target range of start time reduction processing according to the embodiment.

FIG. 5A shows a state in which a VR image obtained by combining a photographed image 504 captured by the camera unit "a" and a photographed image 505 captured by the camera unit "b" is simulatively developed on a plane. A region 501 indicates a segmentation display range displayed on the display unit 205 of the display control apparatus 200. A range 502 and a range 503 indicate the predetermined range. In an example shown in FIG. 5A, the photographed image 504 captured by the camera unit "a" is transmitted from the imaging apparatus 100 to the display control apparatus 200 and a part of the photographed image 504 is displayed on the display unit 205 as the display range. In the following explanation, an example is explained in which, when the predetermined time (the threshold T) elapses, a state of the camera unit "b" is changed according to the display range.

Figure 5B:
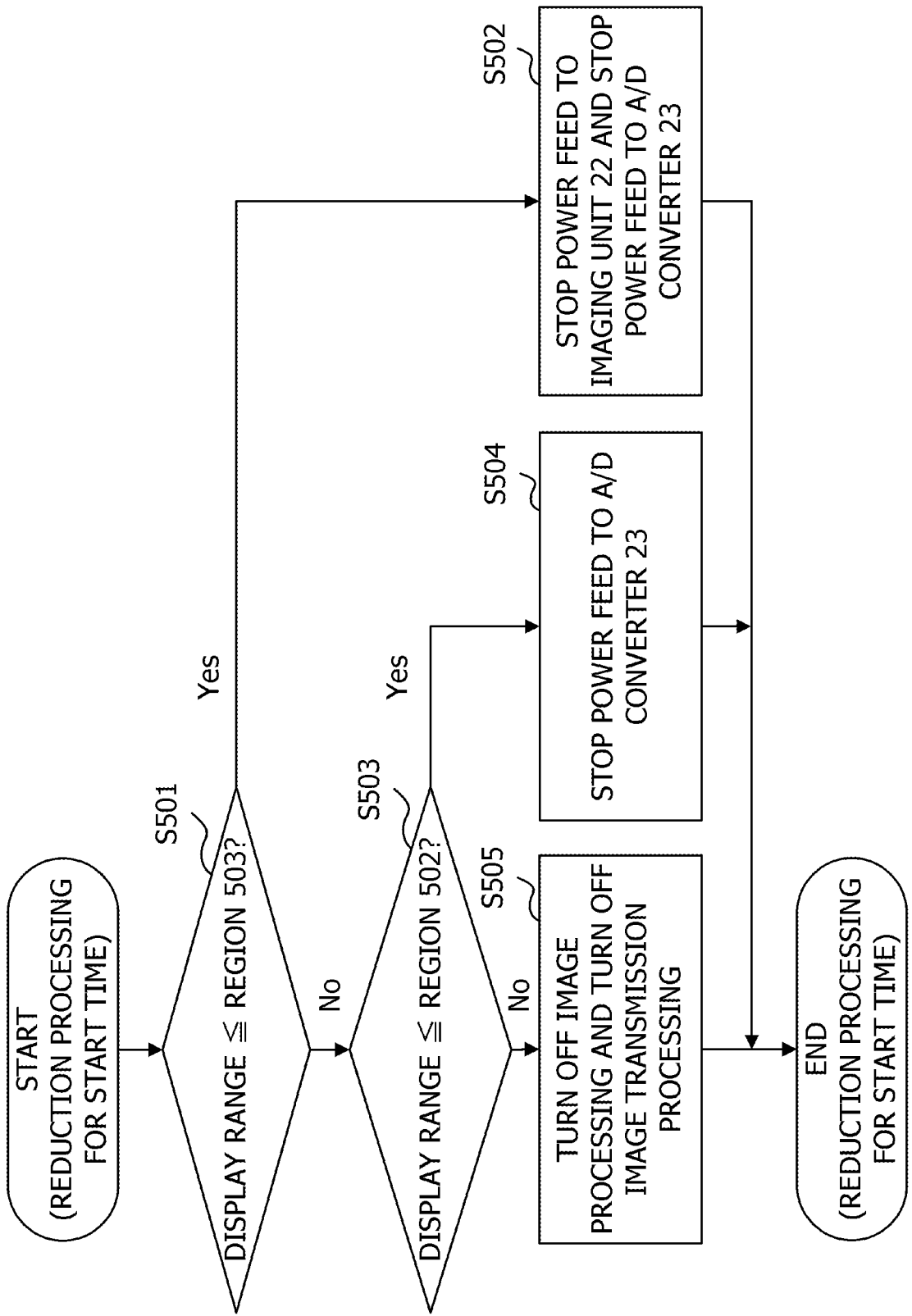
FIG. 5B is a flowchart showing an example of the start time reduction processing according to the embodiment.

FIG. 5B is a flowchart showing an example of the start time reduction processing. When the entire display range is included on the inner side of the range 503 (Yes in S501), the CPU 201 stops power feed to the camera imaging unit 22$b$ and the A/D converter 23$b$ of the imaging apparatus 100 (S502).

When a region further on the outer side than the range 503 is included in the display range and the entire display range is included on the inner side of the range 502 (No in S501 and Yes in S503), the CPU 201 stops power feed to the A/D converter 23b of the imaging apparatus 100 (S504). The CPU 201 performs power feed to the camera imaging unit 22b.

When a region further on the outer side than the range 502 is included in the display range (No in S501 and No in S503), the CPU 201 performs power feed to the camera imaging unit 22b and the A/D converter 23b but does not execute image processing on an image "b" output from the A/D converter 23b. The CPU 201 stops the image transmission by not combining image processing results of the image "b" into a VR image (S505).

<Changing Processing for No-Operation Time>

In this embodiment, the threshold T of the no-operation time explained above is changed by the user performing setting operation. In the following explanation, an example is explained in which the threshold T of the no-operation time is changed using a GUI displayed on the display unit 205 of the display control apparatus 200. However, the changing processing for the no-operation time may be performed by operating the imaging apparatus 100.

Figure 6A:
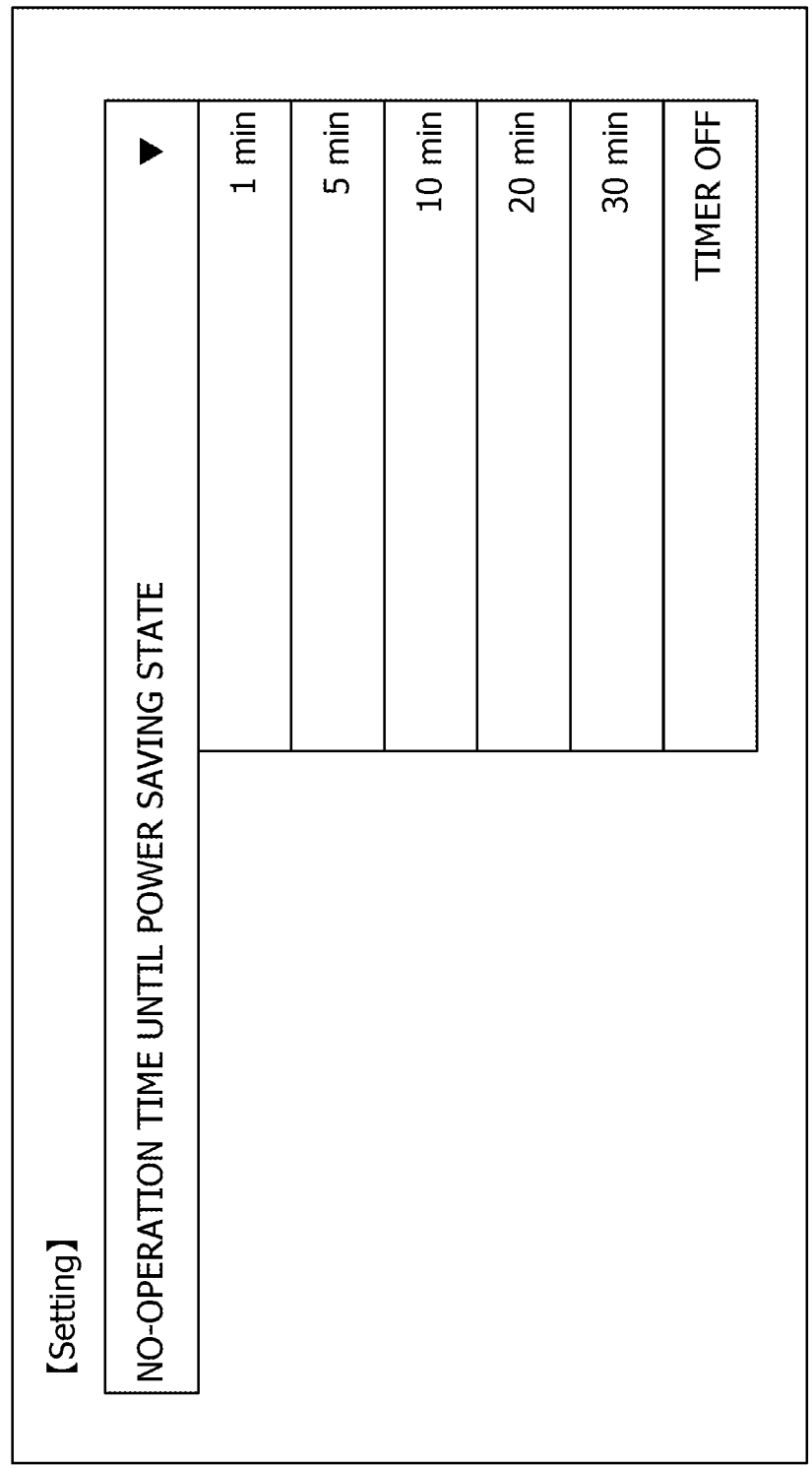
FIG. 6A is a diagram showing an example of a setting screen for a no-operation time according to the embodiment.

FIG. 6A shows an example of a screen of a setting change for the no-operation time displayed on the display unit 205 of the display control apparatus 200. A "power saving state" shown in FIG. 6A includes turning-off of the camera units or a stop of the image transmission of the camera units.

Figure 6B:
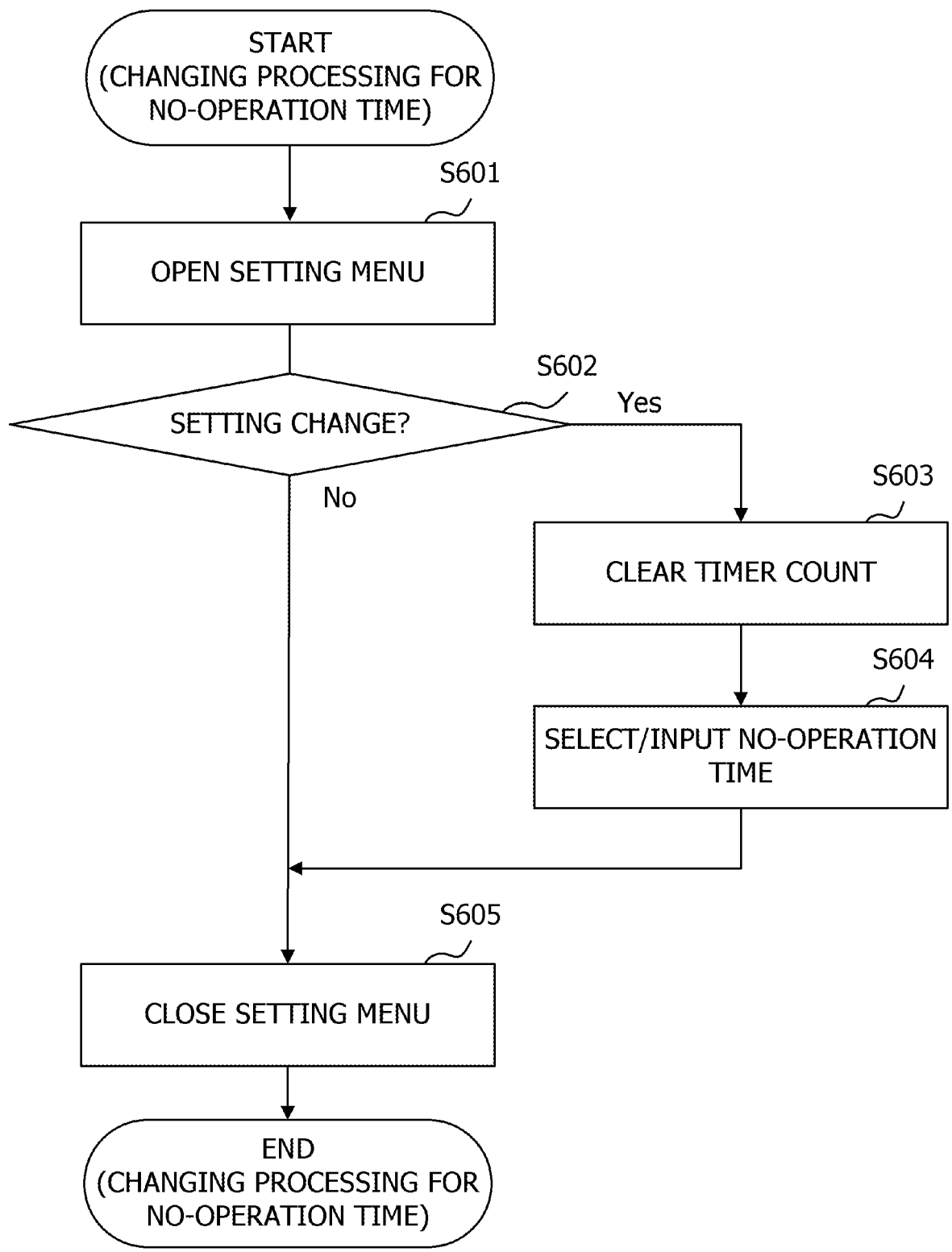
FIG. 6B is a flowchart showing an example of setting processing for the no-operation time according to the embodiment.

FIG. 6B is a flowchart showing an example of the no-operation time changing processing. When a change instruction for the no-operation time is executed, the CPU 201 opens a setting menu of the display control apparatus 200 (S601). When a setting time change for the no-operation time is performed (S602), the CPU 201 performs timer count clear (S603) and records a selected or input time in the memory 102 (S604). The no-operation time setting is adaptable to both of selection of a fixed value and input of any time. The CPU 201 closes the setting menu when an operation instruction for closing the setting menu is given (S605). It is also possible to not set the no-operation time by selecting "timer off" in FIG. 6A.

Advantageous Effects of this Embodiment

As explained above, the display control apparatus according to this embodiment can appropriately reduce power consumption of the imaging apparatus by appropriately controlling driving of the camera units in the imaging apparatus according to switching of the display range. When the imaging apparatus is recording a moving image, it is possible to perform suppression of power consumption corresponding to a use state of the imaging apparatus by stopping transmission of unnecessary photographed images in live view display while recording photographed images obtained by the plurality of camera units. Further, it is possible to suppress a delay of a time required for a camera start while reducing power consumption by changing a stop state of the imaging apparatus.

(Modifications)

In the embodiment explained above, the imaging apparatus including the two camera units is explained as an example. However, three or more camera units may be provided. In this case, the camera units to be turned off may be camera units other than the camera unit that captures an image displayed on the display control apparatus. In the boundary processing explained above, camera units other than the camera unit that captures the image having the largest display range may be turned off. The functions explained above may be provided in a control system including a plurality of imaging apparatuses including one or more camera units and the display control apparatus.

In the embodiment explained above, the processing for reducing power consumption is not performed on the image displayed on the display control apparatus. However, power saving processing for, for example, reducing image quality may be performed.

In the embodiment explained above, the processing for saving power when operation is not received for the predetermined time or more is explained. However, the processing may be performed when predetermined operation is received from the user. Examples of the predetermined operation include user operation performed using a button or a GUI of the imaging apparatus or the display control apparatus. Examples of other predetermined operation include operation for changing a position and a posture of the display control apparatus. For example, the camera units may be turned off in a state in which the user lays the display unit of the display control apparatus face down and may be turned on in the other states.

In the embodiment explained above, the example is explained in which the imaging apparatus performs a stop of the imaging processing or a stop of the image transmission processing in (a part of) the imaging units according to the command of the display control apparatus. However, the imaging apparatus may perform the processing explained above according to determination of the imaging apparatus based on range information of the display control apparatus. Specifically, the imaging apparatus receives, from the display control apparatus, range information of a part of a range displayed on the display control apparatus in a VR image (a combined image). When a part of the range of the VR image is displayed on the display control apparatus on the basis of the range information, the imaging apparatus may perform a stop of the imaging processing in the imaging unit that captures an image of a range not displayed on the display control apparatus or a stop of the transmission processing of the image.

In the embodiment explained above, the example is explained in which the imaging apparatus and the display control apparatus are the separate devices. However, the functional units of the plurality of imaging apparatuses explained above and the functional units of the display control apparatus explained above may be provided in one device.

Second Embodiment

Figure 7:
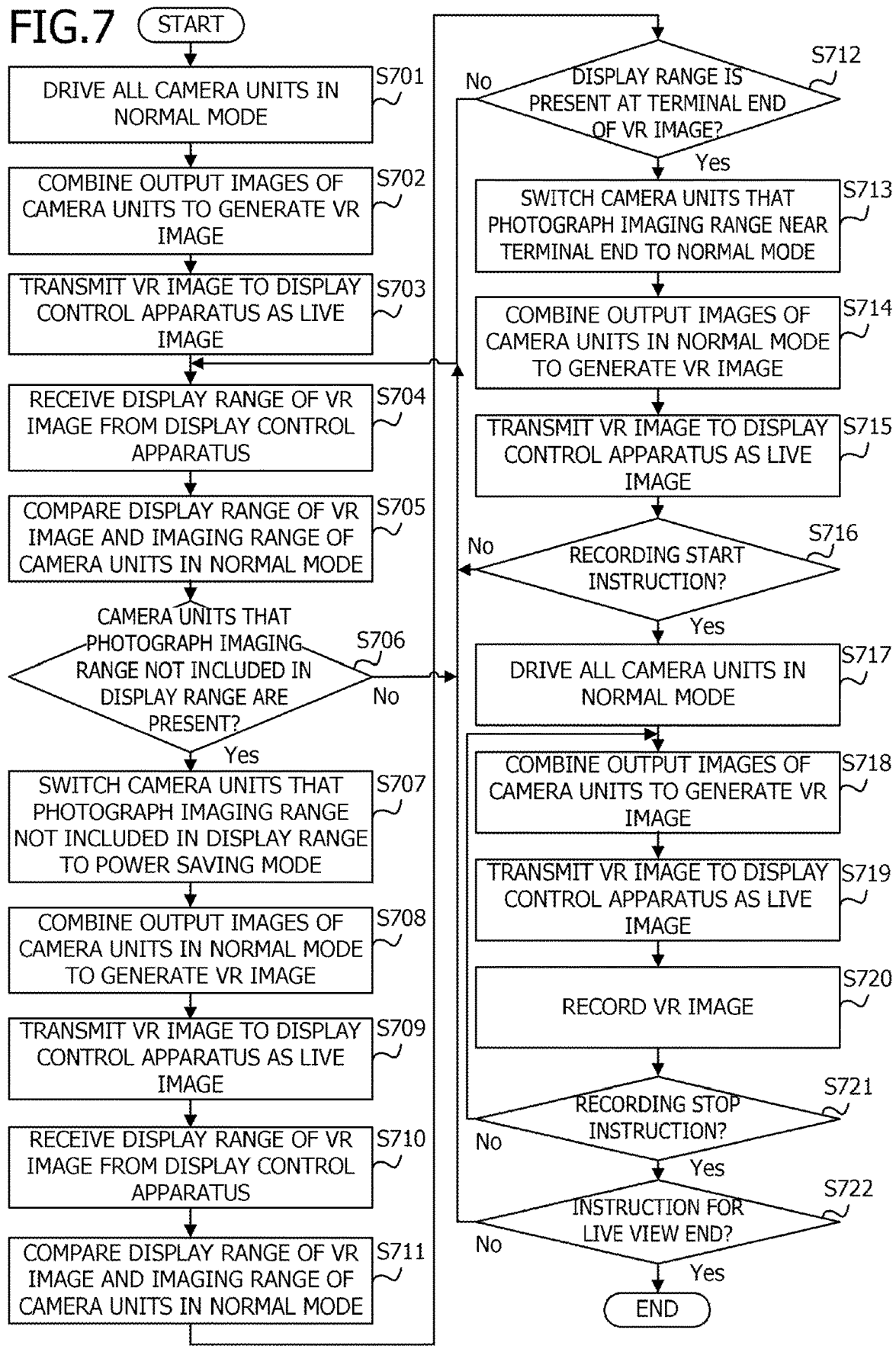
FIG. 7 is a flowchart showing an example of processing of an imaging apparatus according to an embodiment.

The operation of the imaging apparatus 100 in a second embodiment is explained with reference to a flowchart of FIG. 7. It is assumed that the imaging apparatus 100 is supplied with electric power, performs start processing, establishes communication with the display control apparatus 200, and receives a request for live view display from the display control apparatus 200 in advance.

First, the system-control unit 50 controls to drive all camera units (in this embodiment, the camera unit "a" and the camera unit "b") in a normal mode (S701). The system-control unit 50 applies image processing to images output from all the camera units and combines image processing results to generate a VR image (S702). The system-control unit 50 transmits the VR image generated in step S702 to the display control apparatus 200 as a live image (S703).

The system-control unit 50 receives, from the display control apparatus 200, coordinate information indicating a display range displayed on the display unit 205 in the VR image transmitted in step S703 (S704). The system-control unit 50 compares coordinate information indicating combining positions of the images output from the cameras forming the VR image and the coordinate information of the display range received from the display control apparatus 200 (S705).

As a result of the comparison, when camera units that output images not included in the display range are present (Yes in S706), the system-control unit 50 controls to drive, in a power saving mode, the camera units that output the images not included in the display range (S707). In the power saving mode, the system-control unit 50 stops all functions of the camera units, stops at least a part (e.g., at least one of the imaging unit 22 and the A/D converter 23) of the functions of the camera units, or reduces a frame rate of the images output from the camera units. That is, in the power saving mode, the camera units are controlled such that power consumption decreases compared with when the camera units operate in the normal mode. The system-control unit 50 applies image processing to the images output from the camera units driven in the normal mode and combines image processing results to generate a VR image (S708). The system-control unit 50 transmits the VR image generated in step S708 to the display control apparatus 200 as a live image (S709).

In S710 and S711, the system-control unit 50 executes the same processing as the processing in S704 and S705. The system-control unit 50 determines, on the basis of the coordinate information indicating the display range, whether the display range is present near a terminal end of the VR image (S712). When the VR image is generated by only an image output from a part of the camera units, as shown in FIG. 2D, the terminal end 225 and the terminal end 226 are present in the VR image 223. When the position of the display range 224 is present within a predetermined distance from a terminal end of the VR image, the system-control unit 50 determines that the display range is present near the terminal end of the VR image. The system-control unit 50 specifies camera units that output images in an imaging range adjacent to the terminal end present near the display range and controls to drive the specified camera units in the normal mode (S713). In step S713, the system-control unit 50 controls to switch the specified camera units from the power saving mode to the normal mode and drive the specified camera units. The system-control unit 50 applies image processing to images output from camera units driven in the normal mode including the specified camera units and combines image processing results to generate a VR image (S714). The system-control unit 50 transmits the VR image generated in step S712 to the display control apparatus 200 as a live image (S715).

The system-control unit 50 determines whether a recording start instruction is received (S716). When there is input to a predetermined operation member provided in the imaging apparatus 100 or the recording start instruction is received from the display control apparatus 200, the system-control unit 50 determines that the recording start instruction is received. When the recording start instruction is received (Yes in S716), the system-control unit 50 controls to drive all the camera units in the normal mode (S717), applies image processing to images output from all the camera units, and combines image processing results to generate a VR image for recording (S718), transmits the VR image to the display control apparatus 200 as a live image (S719), and records the VR image in a recording medium 120 (S720).

The system-control unit 50 determines whether a recording stop instruction is received (S721). When there is input to the predetermined member provided in the imaging apparatus 100 or when the recording stop instruction is received from the display control apparatus 200, the system-control unit 50 determines that the recording stop instruction is received. When the recording stop instruction is received (Yes in S721), the system-control unit 50 stops the recording processing and determines whether an end instruction for live view display is receive from the display control apparatus 200 (S722). When the end instruction for the live view display is received (Yes in S722), the system-control unit 50 ends this processing. When the end instruction for the live view display is not received (No in S722), the system-control unit 50 returns to the processing in step S704. When the recording stop instruction is not received (No in S721), the system-control unit 50 returns to step S718 and continues the recording processing.

Figure 8:
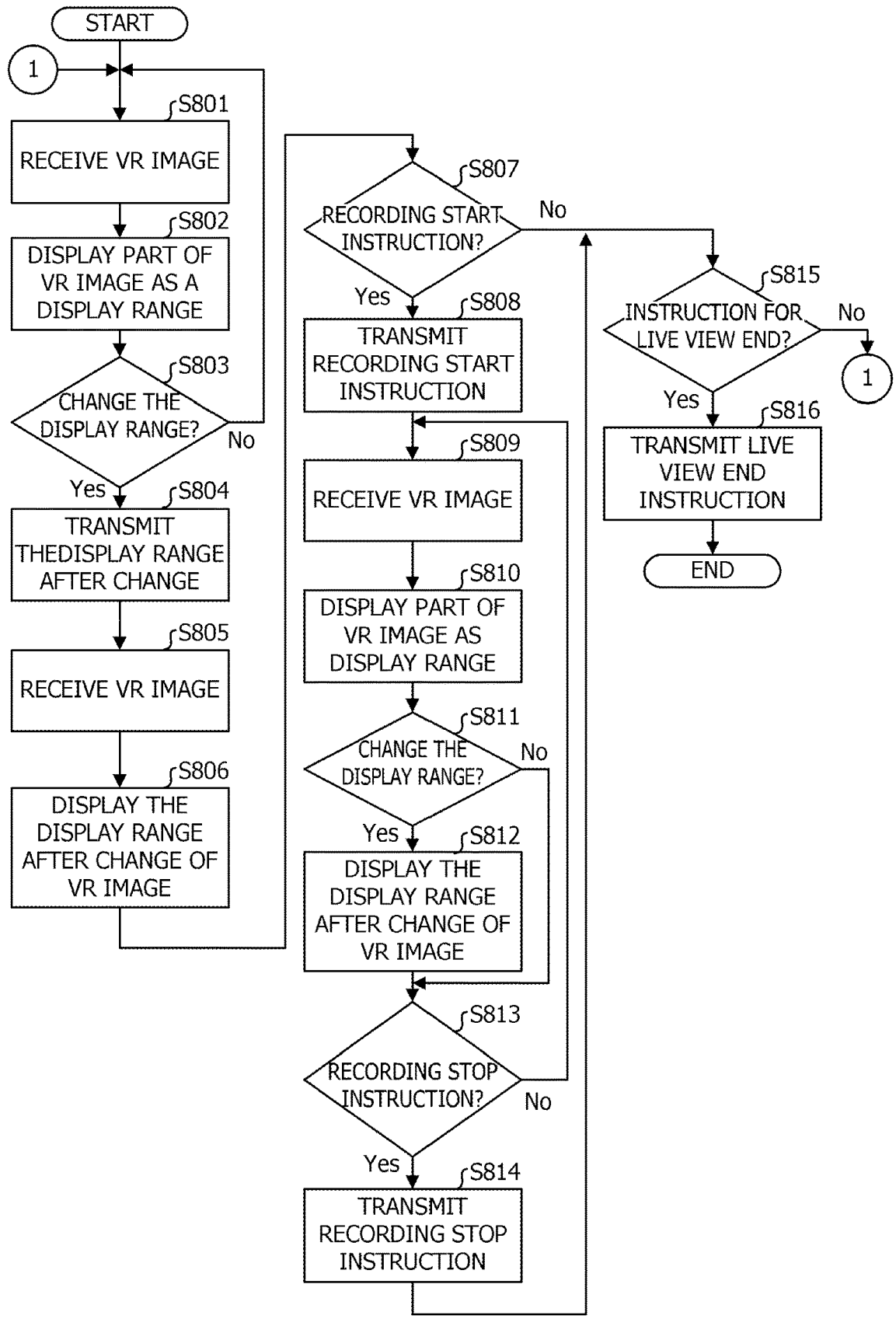
FIG. 8 is a flowchart showing an example of processing of a display control apparatus according to the embodiment.

The operation of the display control apparatus 200 in the second embodiment is explained with reference to a flowchart of FIG. 8. It is assumed that the display control apparatus 200 is supplied with electric power, performs start processing, establishes communication with the imaging apparatus 100, and transmits a request for live view display to the imaging apparatus 100 in advance.

First, the CPU 201 receives the VR image transmitted from the imaging apparatus 100 in S703 (S801) and displays a part of the VR image on the display unit 205 as a display range (S802). In step S802, as an initial position, the CPU 201 displays, for example, the center of the VR image as the display range. The CPU 201 determines whether an instruction for changing the display range of the VR image is received (S803). When there is operation on the touch panel 206a, a change in the posture of the display control apparatus 200, or the like, the CPU 201 determines that a change instruction for the display range is received. When determining that the change instruction for the display range is received (Yes in S803), the CPU 201 transmits coordinate information indicating the display range after the change to the imaging apparatus 100 (S804). The CPU 201 receives the VR image transmitted from the imaging apparatus 100 in S709 or S715 (S805) and displays a part corresponding to the display range after the change in the VR image on the display unit 205 (S806).

When a recording start instruction is received (Yes in S807), the CPU 201 transmits the recording start instruction to the imaging apparatus 100 (S808). The CPU 201 receives the VR image transmitted from the imaging apparatus 100 in S719 (S809) and displays a part corresponding to the selected display range in the VR image on the display unit 205 (S810). When an instruction for changing the display range of the VR image is received (Yes in S811), the CPU 201 displays a part corresponding to the display range after the change in the VR image on the display unit 205 (S812). During the recording, the imaging apparatus 100 drives all the camera units in the normal mode. Therefore, it is unnecessary to switch the normal mode and the power saving mode for each of the camera units. Accordingly, when the imaging apparatus 100 is performing recording, even if the display range of the VR image is changed, the display control apparatus 200 does not transmit coordinate information of the display range to the imaging apparatus 100.

When a recording stop instruction is received (Yes in S813), the CPU 201 transmits the recording stop instruction to the imaging apparatus 100 (S814). When the recording stop instruction is not received (No in S813), the CPU 201 returns to the processing in step S809.

When an end instruction for the live view display is received (Yes in S815), the CPU 201 transmits the end instruction for the live view display to the imaging apparatus 100 (S816). When the end instruction for the live view display is not received (No in S815), the CPU 201 returns to the processing in step S801.

According to this embodiment, the camera units of the imaging apparatus 100 are switched to be driven in the normal mode or the power saving mode according to a change of the display range of the VR image displayed on the display unit 205 of the display control apparatus 200. Consequently, it is possible to drive, in the power saving mode, the camera units that capture images in the range not displayed on the display unit 205 of the display control apparatus 200 and suppress power consumption of the imaging apparatus 100.

Third Embodiment

Figure 9:
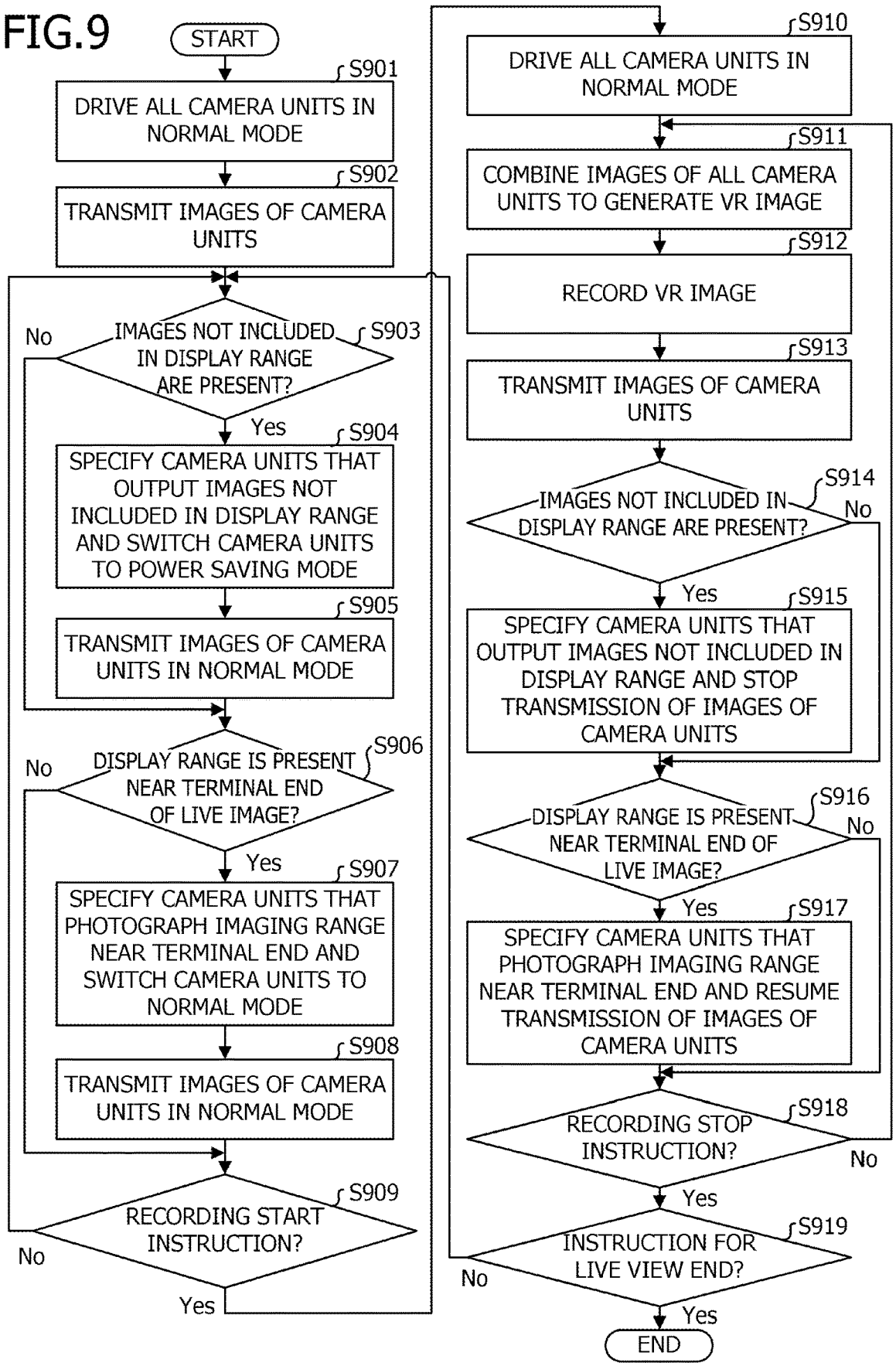
FIG. 9 is a flowchart showing an example of processing of an imaging apparatus according to an embodiment.

The operation of the imaging apparatus 100 in a third embodiment is explained with reference to a flowchart of FIG. 9. It is assumed that the imaging apparatus 100 is supplied with electric power, performs start processing, establishes communication with the display control apparatus 200, and receives a request for live view display from the display control apparatus 200 in advance.

First, the system-control unit 50 controls to drive all camera units (in this embodiment, the camera unit "a" and the camera unit "b") in a normal mode (S901). The system-control unit 50 transmits images output from all the camera units to the display control apparatus 200 (S902).

The system-control unit 50 receives, from the display control apparatus 200, information indicating images displayed or images hidden on the display unit 205 among the images transmitted in step S902. When determining that the hidden images are present (Yes in S903), the system-control unit 50 specifies the camera units that output the hidden images and switches the camera units to be driven in the power saving mode (S904). The system-control unit 50 transmits, to the display control apparatus 200, images output from camera units driven in the normal mode excluding the camera units driven in the power saving mode (S905).

The system-control unit 50 receives information indicating positions of images forming a live image displayed on the display unit 205 and a display range in the live image and determines whether the display range is present near a terminal end of the live image (S906). When the display range is present near the terminal end of the live image (Yes in S906), the system-control unit 50 specifies camera units that output images adjacent to an image including the terminal end and switches the camera units to be driven in the normal mode (S907). The system-control unit 50 transmits the images of the camera units driven in the normal mode to the display control apparatus 200 (S908).

The system-control unit 50 determines whether a recording start instruction is received (S909). When the recording start instruction is received (Yes in S909), the system-control unit 50 controls to drive all the camera units in the normal mode (S910), applies image processing to images output from all the camera units, combines image processing results to generate a VR image for recording (S911), and records the VR image in the recording medium 120 (S912).

The system-control unit 50 transmits the images output from all the camera units to the display control apparatus 200 (S913).

The system-control unit 50 receives, from the display control apparatus 200, information indicating images displayed or images hidden on the display unit 205 among the images transmitted in step S913. When determining that the hidden images are present (Yes in S914), the system-control unit 50 specifies the camera units that output the hidden images and stops transmission of the images output from the specified camera units to the display control apparatus 200 (S915).

When information indicating that the display range of the display unit 205 is present near the terminal end of the live image is received from the display control apparatus 200 (Yes in S916), the system-control unit 50 specifies camera units that output images adjacent to the vicinity of the terminal end and resumes the transmission of images output from the specified camera units to the display control apparatus 200 (S917).

When a recording stop instruction is received (Ye in S918), the system-control unit 50 stops the recording processing and determines whether an end instruction for the live view display is received from the display control apparatus 200 (S919). When the end instruction for the live view display is received (Yes in S919), the system-control unit 50 ends this processing. When the end instruction for the live view display is not received (No in S919), the system-control unit 50 returns to the processing in step S903. When the recording stop instruction is not received (No in S721), the system-control unit 50 returns to step S911 and continues the recording processing.

Figure 10:
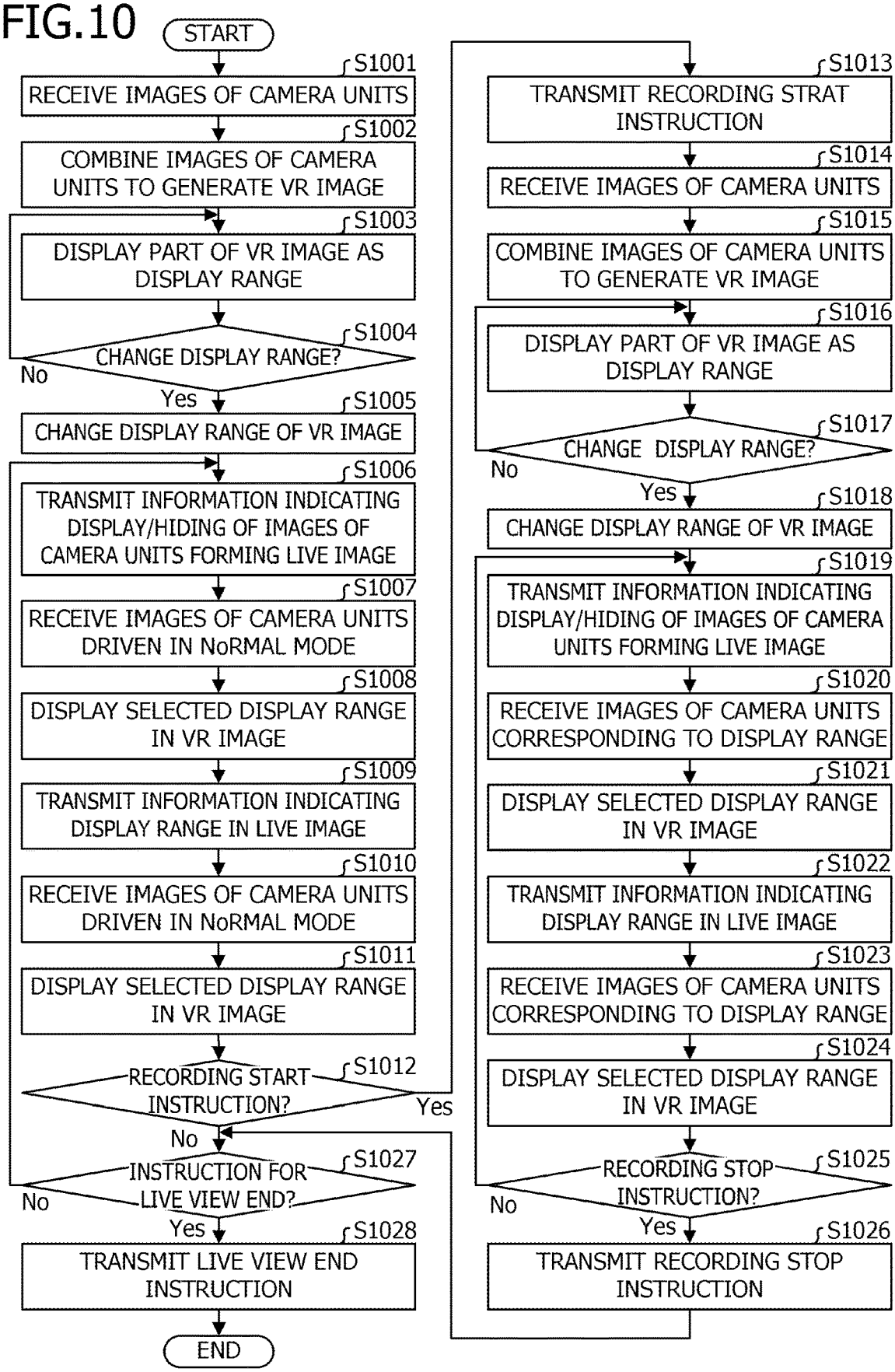
FIG. 10 is a flowchart showing an example of processing of a display control apparatus according to the embodiment.

The operation of the display control apparatus 200 in the third embodiment is explained with reference to a flowchart of FIG. 10. It is assumed that the display control apparatus 200 is supplied with electric power, performs start processing, establishes communication with the imaging apparatus 100, and transmits a request for live view display to the imaging apparatus 100 in advance.

First, the CPU 201 receives the images output from the camera units and transmitted from the imaging apparatus 100 in S902 (S1001) and combines a received plurality of images to generate a VR image (S1002). The CPU 201 displays a part of the VR image on the display unit 205 as a display range (S1003). In step S1003, as an initial position, the CPU 201 displays, for example, the center of the VR image as a display range. When an instruction for changing the display range of the VR image is received (Yes in S1004), the CPU 201 displays a part corresponding to the display range after the change on the display unit 205 (S1005).

The CPU 201 generates information indicating display or hiding for each of the images forming the VR image and transmits the information to the imaging apparatus 100 (S1006). In response to the transmission of the information, the imaging apparatus 100 executes the processing in S903 to S905. The CPU 201 receives the images transmitted from the imaging apparatus 100 in S905 (S1007), combines the received images to generate a VR image, and displays a part corresponding to the present display range in the VR image on the display unit 205 (S1008).

The CPU 201 generates information indicating the display range in the VR image generated as the live image and positions of the images forming the VR image and transmits the information to the imaging apparatus 100 (S1009). In response to the transmission of the information, the imaging apparatus 100 executes the processing in S906 to S908. The CPU 201 receives the image transmitted from the imaging apparatus 100 in S908 (S1010), combines the received images to generate a VR image, and displays a part corresponding to the present display range on the display unit 205 (S1011).

When a recording start instruction is received (Yes in S1012), the CPU 201 transmits the recording start instruction to the imaging apparatus 100 (S1013). The CPU 201 receives the images of the camera units transmitted from the imaging apparatus 100 in S913 (S1014) and combines a received plurality of images to generate a VR image (S1015). The CPU 201 displays a part of the VR image on the display unit 205 as a display range (S1016). When an instruction for changing the display range of the VR image is received (Yes in S1017), the CPU 201 displays a part corresponding to the display range after the change in the VR image on the display unit 205 (S1018).

The CPU 201 generates information indicating display or hiding for each of the images forming the VR image and transmits the information to the imaging apparatus 100 (S1019). In response to the transmission of the information, the imaging apparatus 100 executes the processing in S914 and S915. The CPU 201 receives the images transmitted from the imaging apparatus 100 in S915 (S1020), combines the received images to generate a VR image, and displays a part corresponding to the present display range in the VR image on the display unit 205 (S1021).

The CPU 201 generates information indicating the display range in the VR image generated as the live image and positions of the images forming the VR image and transmits the information to the imaging apparatus 100 (S1022). In response to the transmission of the information, the imaging apparatus 100 executes the processing in S916 and S917. The CPU 201 receives the images transmitted from the imaging apparatus 100 in S917 (S1023), combines the received images to generate a VR image, and displays a part corresponding to the present display range in the VR image on the display unit 205 (S1024).

When a recording stop instruction is received (Yes in S1025), the CPU 201 transmits the recording stop instruction to the imaging apparatus 100 (S1026). When the recording stop instruction is not received (No in S1025), the CPU 201 returns to the processing in step S1019.

When an end instruction for the live view display is received (Yes in S1027), the CPU 201 transmits the end instruction for the live view display to the imaging apparatus 100 (S1028). When the end instruction for the live view display is not received (No in S1027), the CPU 201 returns to the processing in step S1006.

According to this embodiment, the camera units of the imaging apparatus 100 are switched to be driven in the normal mode or the power saving mode according to a change of the display range of the VR image displayed on the display unit 205 of the display control apparatus 200. Consequently, it is possible to drive, in the power saving mode, camera units that capture images in a range not displayed on the display unit 205 of the display control apparatus 200 and suppress power consumption of the imaging apparatus 100.

According to this embodiment, even when the imaging apparatus 100 needs to drive all the camera units in the normal mode during the recording processing, whether images are transmitted is switched for each of the camera units of the imaging apparatus 100 according to a change of the display range of the VR image displayed on the display unit 205 of the display control apparatus 200. Consequently, it is possible to stop transmission of images of camera units that capture images in a range not displayed on the display unit 205 of the display control apparatus 200 and suppress power consumption of the imaging apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095205, filed on May 17, 2018 and Japanese Patent Application No. 2019-086091, filed on Apr. 26, 2019, which is hereby incorporated by reference herein in its entirety.

What is claimed is:

1. An imaging apparatus comprising:
a plurality of image processing devices configured to output images obtained by imaging an object respectively in different directions;
a generating device configured to combine images output by the plurality of image processing devices to generate a combined image;
a recording device configured to record the combined image in a recording medium;
an acquiring device configured to acquire display range information indicating a display range displayed on a screen in the combined image; and
a control device configured to:
control the plurality of image processing devices to drive in a first mode regardless of the display range information, in a case where the combined image is recorded in the recording medium; and
control (1) a first image processing device to drive in the first mode, wherein the first image processing device outputs an image corresponding to the display range in the combined image, and (2) a second image processing device to drive in a second mode in which power is saved compared with the first mode, wherein the second image processing device outputs an image corresponding to a non-displayed range in the combined image on the basis of the display range information, in a case where the combined image is not recorded in the recording medium.

2. The imaging apparatus according to claim 1, further comprising:
a transmitting device configured to transmit the combined image to an external device,
wherein the acquiring device is further configured to acquire, from the external device, display range information indicating a display range displayed on a screen of the external device.

3. The imaging apparatus according to claim 1, further comprising:
a transmitting device configured to transmit a plurality of images output by the plurality of image processing devices to an external device,
wherein the acquiring device is further configured to acquire, from the external device, display range information indicating a display range displayed on a screen of the external device in a combined image generated by combining the plurality of images in the external device.

4. The imaging apparatus according to claim 3, wherein the transmitting device is further configured to transmit an image output by the first image processing device, and not to transmit an image output by the second image processing device.

5. The imaging apparatus according to claim 1,
wherein the image processing device is further configured to include an imaging device and an A/D converter configured to convert an analog signal output from the imaging device into a digital signal, and
wherein the control device is further configured to stop at least one of the imaging device and the A/D converter to thereby drive the image processing device in the second mode.

6. A method of controlling an imaging apparatus including a plurality of image processing devices configured to output images obtained by imaging an object respectively in different directions, the method comprising:
combining the images output by the plurality of image processing devices to generate a combined image;
recording the combined image in a recording medium;
acquiring display range information indicating a display range displayed on a screen in the combined image;
controlling the plurality of image processing devices to drive in a first mode regardless of the display range information, in a case where the combined image is recorded in the recording medium; and
controlling (1) a first image processing device to drive in the first mode, wherein the first image processing device outputs an image corresponding to the display range in the combined image, and (2) a second image processing device to drive in a second mode in which power is saved compared with the first mode, wherein the second image processing device outputs an image corresponding to a non-displayed range in the combined image on the basis of the display range information, in a case where the combined image is not recorded in the recording medium.

7. A non-transitory computer readable medium that stores a program executable by a computer to execute a method of controlling an imaging apparatus including a plurality of image processing devices configured to output images obtained by imaging an object respectively in different directions, the method comprising:
combining the images output by the plurality of image processing devices to generate a combined image;
recording the combined image in a recording medium;
acquiring display range information indicating a display range displayed on a screen in the combined image;
controlling the plurality of image processing devices to drive in a first mode regardless of the display range information, in a case where the combined image is recorded in the recording medium; and
controlling (1) a first image processing device to drive in the first mode, wherein the first image processing device outputs an image corresponding to the display range in the combined image, and (2) a second image processing device to drive in a second mode in which power is saved compared with the first mode, wherein the second image processing device outputs an image corresponding to a non-displayed range in the combined image on the basis of the display range information, in a case where the combined image is not recorded in the recording medium.

* * * * *